(12) United States Patent
Kato et al.

(10) Patent No.: US 7,495,432 B2
(45) Date of Patent: Feb. 24, 2009

(54) ANGLE DETECTING APPARATUS

(75) Inventors: Yukihiro Kato, Chiryu (JP); Masashi Momiyama, Chiryu (JP); Noriaki Fujita, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/081,854

(22) Filed: Apr. 22, 2008

(65) Prior Publication Data

US 2008/0265877 A1      Oct. 30, 2008

(30) Foreign Application Priority Data

Apr. 25, 2007   (JP)   ............................. 2007-115828
Apr. 11, 2008   (JP)   ............................. 2008-103868

(51) Int. Cl.
*G01B 7/30*   (2006.01)
*G01R 33/07*  (2006.01)

(52) U.S. Cl. ............... 324/207.25; 324/174; 324/207.2; 324/251

(58) Field of Classification Search ......... 324/173–174, 324/207.2, 207.25, 251; 73/514.31, 514.39; 338/32 R, 32 H
See application file for complete search history.

(56) References Cited

U.S. PATENT DOCUMENTS 6,469,499 B2 * 10/2002 Delaporte ............... 324/207.13
6,545,462 B2   4/2003 Schott et al.
6,762,897 B1   7/2004 Kabashima et al.
7,064,537 B2 * 6/2006 Sudo et al. ............. 324/207.21
2001/0009367 A1 * 7/2001 Seitzer et al. .......... 324/207.21

FOREIGN PATENT DOCUMENTS

JP   2007-040850        8/2005
WO   WO 2007/057563 A1  11/2006

* cited by examiner

*Primary Examiner*—Bot LeDynh
(74) *Attorney, Agent, or Firm*—Reed Smith LLP; Stanley P. Fisher, Esq.; Juan Carlos A. Marquez, Esq.

(57) ABSTRACT

An angle detection apparatus includes a rotation member including at least one north magnetic polar region and at least one south magnetic polar region alternately arranged around a rotation center, a magnetic field detecting portion having a magnetic plate and detecting elements detecting magnitudes of magnetic components in a direction perpendicular to the magnetic plate, and a computing unit determining a rotation angle of the rotation member, wherein the magnetic field detecting portion is disposed so that the magnetic plate is oriented perpendicular to a first direction, where magnetic field intensity is at its maximum, and the magnetic field detecting portion detects the magnitudes of the magnetic components in the first direction and a second direction corresponding to a direction that the north and south magnetic polar regions are circumferentially arranged.

15 Claims, 15 Drawing Sheets

FIG. 2
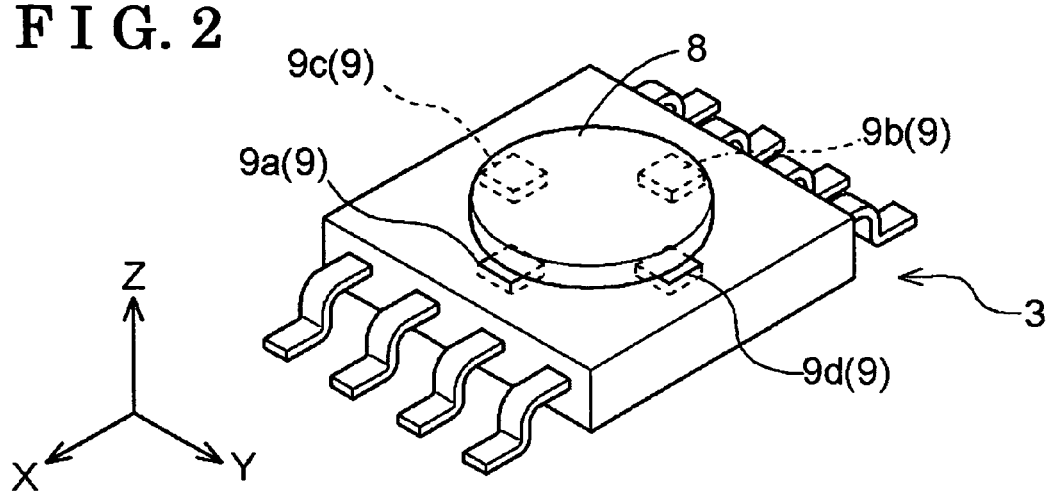
FIG. 3
(a)
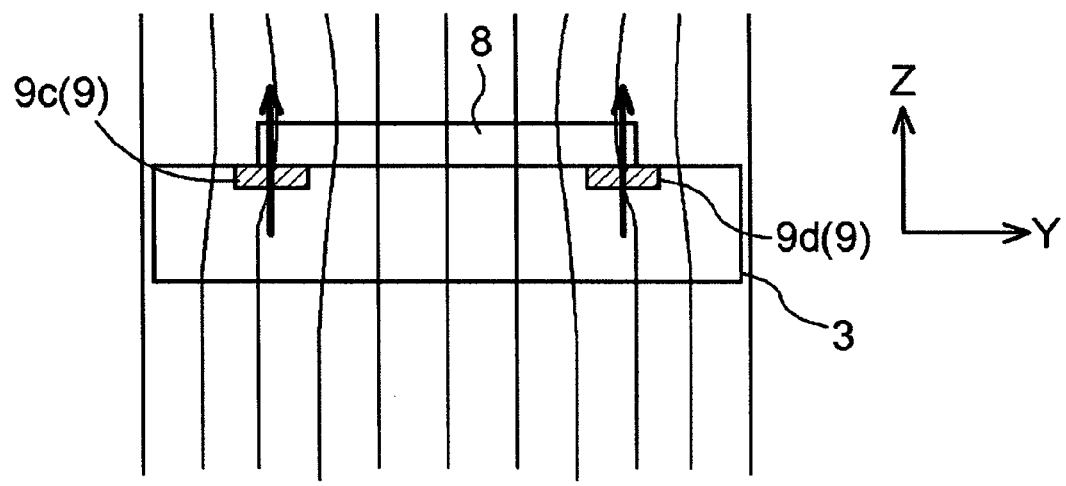
(b)
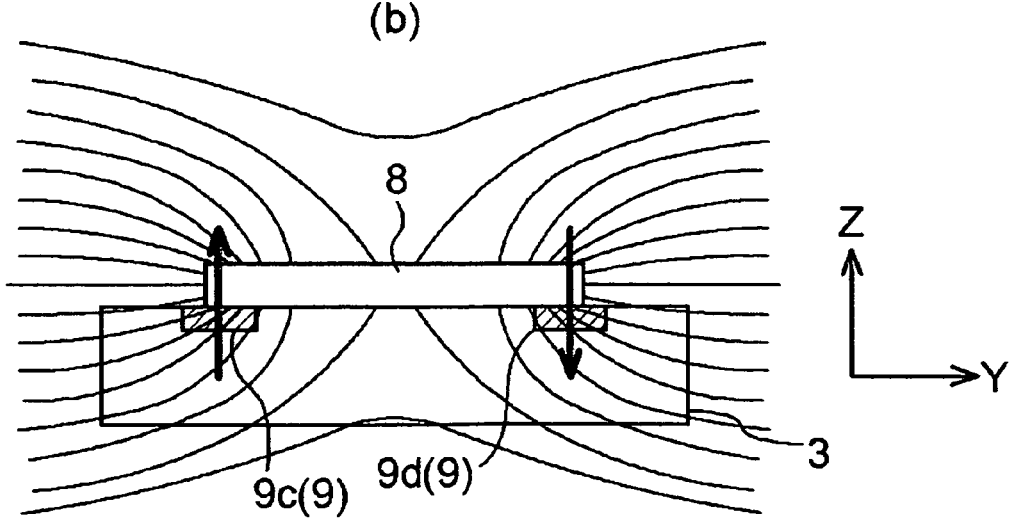

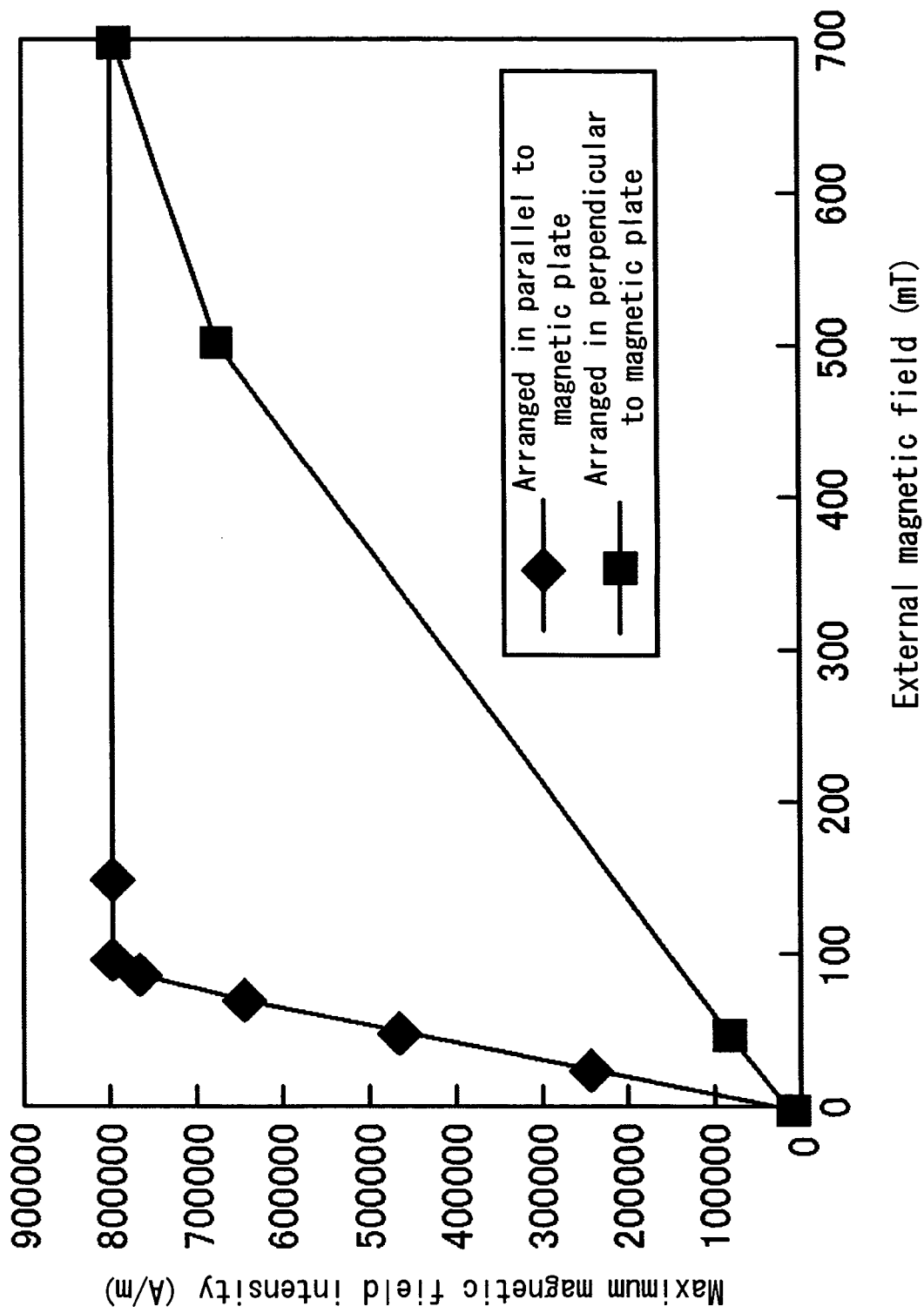

ANGLE DETECTING APPARATUS

CROSS REFERENCE TO RELATED APPLICATIONS

This application is based on and claims priority under 35 U.S.C. § 119 to Japanese Patent Application 2007-115828, filed on Apr. 25, 2007 and Japanese Patent Application 2008-103868, filed on Apr. 11, 2008, the entire contents of which are incorporated herein by reference.

FIELD OF THE INVENTION

This invention generally relates to an angle detecting apparatus.

BACKGROUND

An angle detecting apparatus disclosed in JP2007-40850 is used, for example, as a steering angle sensor, a shaft position sensor and the like for an automobile. In the angle detecting apparatus, a magnetic field detecting portion detects magnitudes of components of magnetic fields in two directions in terms of a magnetic field generated around a rotation member. The two directions correspond to a radial direction of the rotation member, and a direction that a north magnetic polar region and a south magnetic polar region are circumferentially arranged, which is orthogonal with respect to the radial direction of the rotation member. A computing means computes a rotation angle of the rotation member based on a ratio of the magnitudes of the components of the magnetic fields in the two directions detected by the magnetic field detecting portion. (Refer to JP2007-40850.)

The magnetic field detecting portion includes, for example, a hall IC as shown in FIG. 2. The magnetic field detecting portion 3 includes a magnetic plate 8, and multiple detecting elements 9 (i.e., a set of detecting elements 9) detecting the magnetic field generated around a rotation member 2. The magnetic plate 8 is disk-shaped. The set of detecting elements 9 (i.e., hall elements) are positioned directly beneath end portions of the magnetic plate 8. The set of detecting elements 9 include a pair of detecting elements 9a, 9b arranged in an X-direction and another pair of detecting elements 9c, 9d arranged in a Z-direction.

For example, as shown in FIG. 19, in the known angle detecting apparatus, the rotation member 2 fitted around a rotation shaft 1 is positioned so that each of north magnetic polar regions 5 and south magnetic polar regions 6 faces radially outwardly. The magnetic field detecting portion 3 is disposed on a substrate 7 which is positioned radially outward of the rotation member 2 and faces each of the north magnetic polar regions 5 and the south magnetic polar regions 6. The magnetic field detecting portion 3 is positioned so that the magnet plate 8 faces parallel to the radial direction of the rotation member 2 for detecting the magnitudes of the components of the magnetic fields in two directions, that is, in the radial direction of the rotation member 2, and in the direction that the north magnetic polar region 5 and the south magnetic polar region 6 are circumferentially arranged.

The detection principle of the magnetic field detecting portion 3 will be described referring to FIGS. 3A, 3B and 19. FIGS. 3A and 3B are sectional views seen from the X-direction and illustrating states of a magnetic flux.

In this example, the radial direction of the rotation member 2 corresponds to the Y-direction, the direction that the north magnetic polar region 5 and the south magnetic polar region 6 are circumferentially arranged corresponds to the X-direction, and a direction orthogonal with respect to the Y-direction and the X-direction corresponds to the Z-direction.

As shown in FIG. 3B, when an external magnetic field is applied in the Y-direction, the magnetic flux is bent by the magnetic plate 8 and components of the magnetic fields are generated on the pair of detecting elements 9c, 9d arranged in the Y-direction, the components of the magnetic fields being perpendicular to the magnetic plate 8, that is, in the Z-direction. At this time, a magnitude of a component of a magnetic field in the Z-direction is proportional to a magnitude of the applied external magnetic field. In addition, directions are opposite between the component of the magnetic field generated on the detecting element 9c and the component of the magnetic field generated on the detecting element 9d. Consequently, a component of a magnetic field that is proportional to the magnitude of the applied external magnetic field is detected by calculating a difference between an output voltage of the detecting element 9c and an output voltage of the detecting element 9d. When an external magnetic field is applied in the X-direction, components of magnetic fields in the Z-direction, that is, perpendicular to the magnetic plate 8, are generated similarly to when the external magnetic field is applied in the Y-direction. Therefore, the magnetic field detecting portion 3 detects a magnitude of a component of a magnetic field in the X-direction by calculating a difference of output voltages between the pair of detecting elements 9a, 9b arranged in the X-direction.

A possible disturbing external magnetic field is removed in a following manner. As shown in FIG. 3A, when the external disturbing magnetic field is applied in the Z-direction, components of magnetic fields are generated on the pair of detecting elements 9c, 9d arranged in the Y-direction, the components of the magnetic fields being perpendicular to the magnetic plate 8. At this time, directions of the generated components of the magnetic fields are the same between the detecting elements 9c and 9d. Consequently, the disturbing external magnetic field applied in the Z-direction is canceled out by calculating a difference between an output voltage of the detecting element 9c and an output voltage of the detecting element 9d.

As shown in FIG. 19, in the known angle detecting apparatus, a distance R from a surface of the north magnetic polar region 5 or a surface of the south magnetic polar region 6 to the magnetic field detecting portion 3 is long, the distance R being in the radial direction of the rotation member 2. Due to this, the north magnetic polar region 5 and the south magnetic polar region 6 need to be made of, for example, rare-earth magnet having a high magnetic attraction in order to assure desired magnetic field intensity of the magnetic field applied to the magnetic field detecting portion 3, thereby causing cost increase. However, when the distance R from the surface of the north magnetic polar region 5 or the surface of the south magnetic polar region 6 to the magnetic field detecting portion 3 is reduced, magnetic field intensity applied to the magnetic field detecting portion 3 may become too high. When the magnetic field intensity applied to the magnetic field detecting portion 3 is too high, a magnetic flux on the magnetic plate 8 becomes dense, thereby making the magnetic plate 8 magnetically saturated. When the magnetic plate 8 is magnetically saturated, a magnetic field of which intensity is proportional to the external magnetic field is not generated in the perpendicular direction to the magnetic plate 8. Therefore, when the distance R from the surface of the north magnetic polar region 5 or the surface of the south magnetic polar region 6 to the magnetic field detecting portion 3 is reduced, magnitudes of components of magnetic fields in the two directions may not be detected by the magnetic field detecting portion 3.

In the known angle detecting apparatus shown in FIG. 19, magnetic field intensity applied to the magnetic field detecting portion 3 is not constant and varies according to a rotation angle of the rotation member 2 as shown in FIG. 20. FIG. 20 shows the magnetic field intensity applied to the magnetic field detecting portion 3 as the rotation angle of the rotation member 2 is changed. A state shown in FIGS. 19A and 19B, where a circumferentially central portion of the north magnetic polar region 5 faces the magnetic field detecting portion 3, corresponds to a state where the rotation angle is 0 degrees. The magnetic field intensity applied to the magnetic field detecting portion 3 also varies according to variations of dimensions or characteristics of the magnetic field detecting portion 3. An ideal range of the magnetic field intensity (for example, form 20 mT to 70 mT) is defined for operating the magnetic field detecting portion 3. Therefore, an operating range of the magnetic field detecting portion 3 may not be set to be larger than the defined upper limit. In addition, since the magnetic field intensity applied to the magnetic field detecting portion 3 varies as described above, the operating range of the magnetic field detecting portion 3 may be small. Consequently, the magnetic field detecting portion 3 may be susceptible to effects of an external disturbing magnetic field, leading to reduction of detection accuracy. This requires a countermeasure such as providing a magnetic shield, thereby increasing a cost of the angle detecting apparatus.

A need thus exists for an angle detecting apparatus which is not susceptible to the drawback mentioned above.

SUMMARY OF THE INVENTION

An angle detection apparatus includes a rotation member including at least one north magnetic polar region and at least one south magnetic polar region alternately arranged around a rotation center thereof, a magnetic field detecting portion having a magnetic plate and a plurality of detecting elements detecting magnitudes of magnetic components in a direction perpendicular to the magnetic plate and storing the magnitudes of the magnetic components as information, a computing unit determining a rotation angle of the rotation member based on the information detected by the magnetic field detection portion, wherein the magnetic field detecting portion is disposed so that the magnetic plate is oriented perpendicular to a first direction, where magnetic field intensity is at its maximum in a magnetic field generated around the rotation member, and the magnetic field detecting portion detects the magnitudes of the magnetic components in the first direction and a second direction which corresponds to a direction that the north magnetic polar regions and the south magnetic polar regions are circumferentially arranged.

BRIEF DESCRIPTION OF THE DRAWINGS

The foregoing and additional features and characteristics of the present invention will become more apparent from the following detailed description considered with reference to the accompanying drawings, wherein:

FIG. 2 is a perspective view of a magnetic field detecting portion;

FIGS. 3A and 3B are sectional views of the magnetic field detecting portion;

FIG. 4 is a graph showing a relationship between an external magnetic field and its maximum magnetic field intensity of a magnetic plate;

DETAILED DESCRIPTION

An angle detecting apparatus according to embodiments of the present invention will be described with reference to drawings.

First Embodiment

Figure 1A:
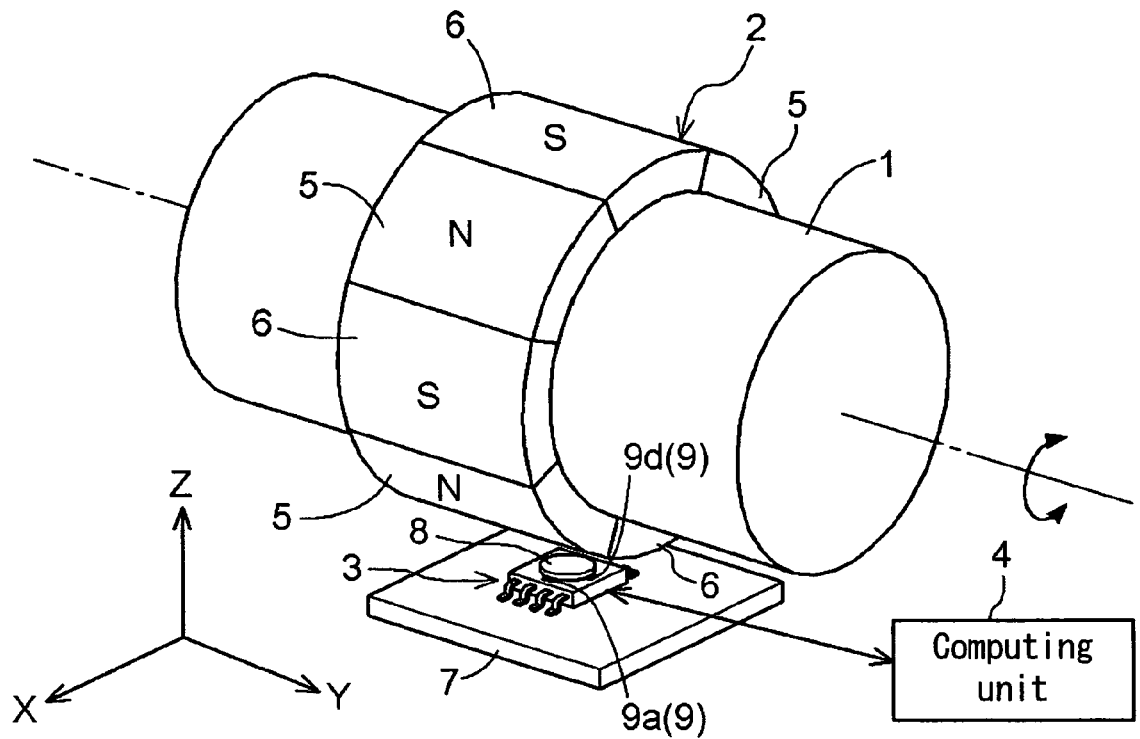
FIG. 1A is a perspective view of an angle detecting apparatus according to a first embodiment and FIG. 1B is a sectional view of the angle detecting apparatus according to the first embodiment.
Figure 1B:
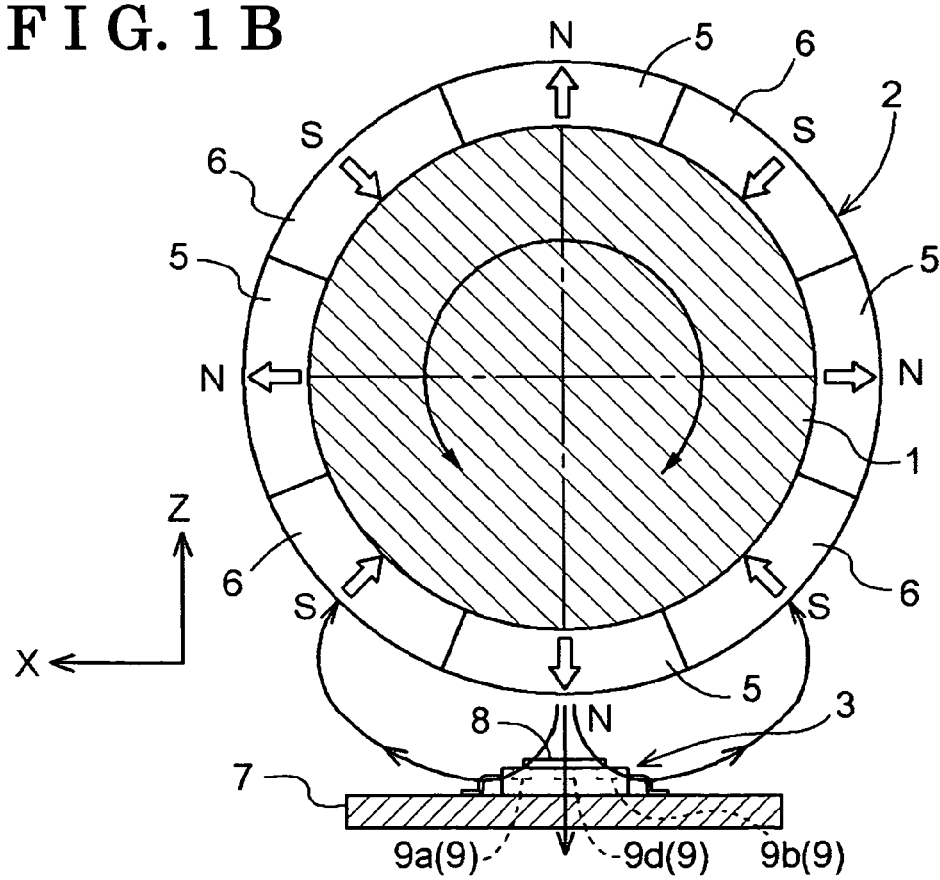

The angle detecting apparatus includes a rotation member 2 fitted around a rotation shaft 1, a magnetic field detecting portion 3 detecting a magnetic field generated around the rotation member 2, and a computing unit 4 (computing means 4) computing a rotation angle of the rotation member 2 relative to the magnetic field detecting portion 3 based on detection information of the field detecting portion 3. FIG. 1A is a perspective view of the angle detecting apparatus according to the first embodiment and FIG. 1B is a sectional view thereof seen from the Y-direction.

The rotation member 2 is provided so as to unitary rotate with the rotation shaft 1. The rotation member 2 includes a ring magnet where north magnetic polar regions 5 and south magnetic polar regions 6 are arranged alternately around a rotation center. The rotation member 2 is provided with four north magnetic polar regions 5 and four south magnetic polar regions 6 with intervals of 45 degrees therebetween. A polar anisotropic magnet or a radial anisotropic magnet may be used as the rotation member 2. Alternatively, an isotropic magnet magnetized to have a sinusoidal flux density distribution on a surface thereof may be used. As will be explained later, however, it would be advantageous to use the polar anisotropic magnet or the isotropic magnet magnetized in a manner that distribution of the flux density is substantially sinusoidal over the surface of the magnet.

Figure 8:
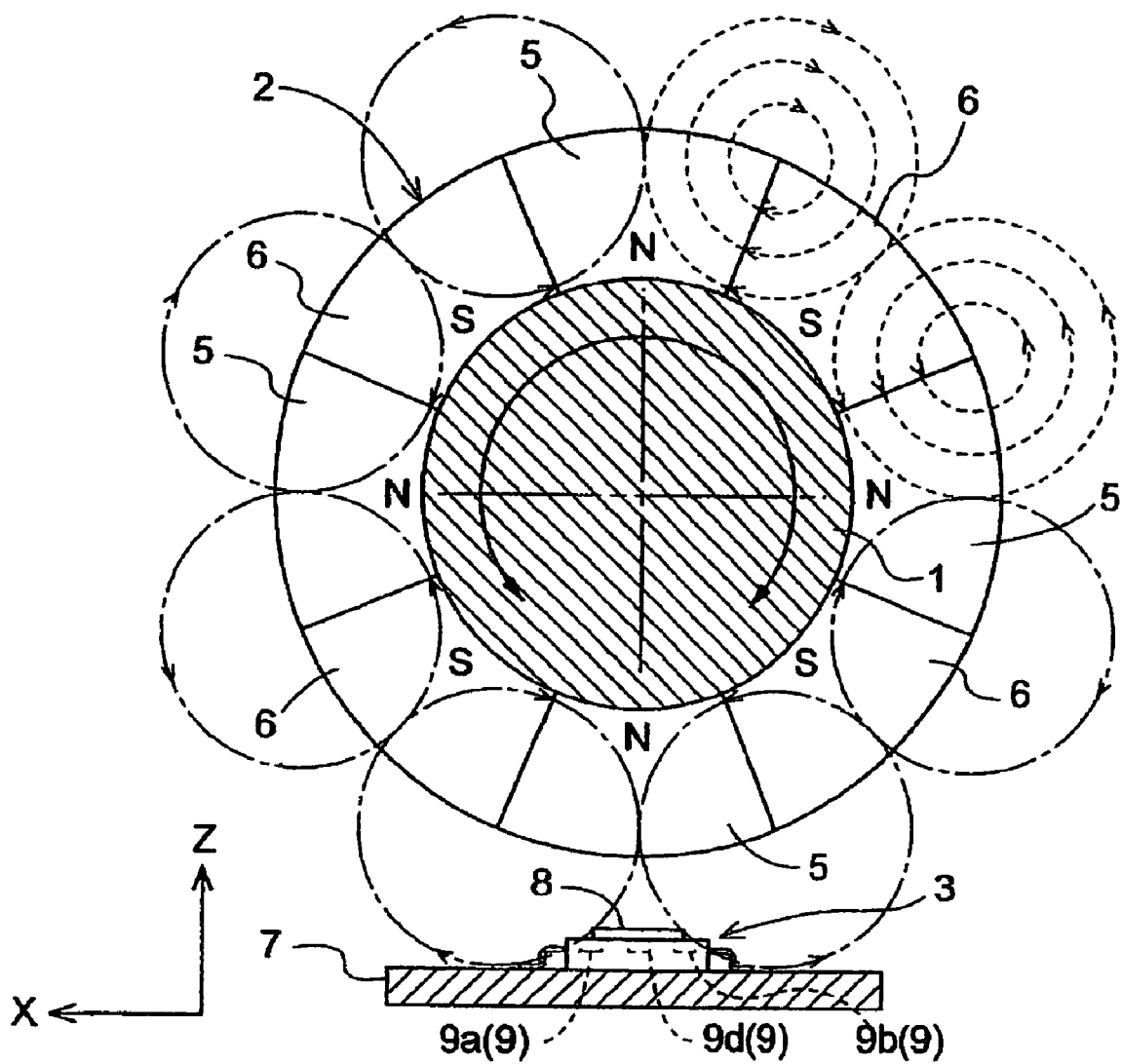
FIG. 8 is a schematic view showing magnetic field lines in the rotation member.

When using the polar anisotropic magnet or using the isotropic magnet magnetized to have the sinusoidal flux density distribution on the surface thereof for the rotation member 2, magnetization is performed by energizing plural lead wires arranged on the ring magnet in a circumferential direction thereof. As shown in FIG. 8, therefore, distribution of magnetic field lines indicates circles each having a center thereof on a boundary portion between the north magnetic polar region 5 and the south magnetic polar region 6 on an outer periphery surface of the rotation member 2, and each passing through a circumferential center of the north magnetic polar region 5 and a circumferential center of the south magnetic polar region 6 respectively. Therefore, it is desirable that a radial width of the ring magnet that includes the north magnetic polar regions 5 and the south magnetic polar regions 6 is set to be larger than half a circumferential width of each of the north magnetic polar regions 5 and than half a circumferential width of each of the south magnetic polar regions 6. Such radial width of the ring magnet provides a favorable flux density distribution around the rotation member 2 without discontinuing the lines of magnetic force.

The rotation member 2 is positioned so that each of the north magnetic polar region 5 and the south magnetic polar region 6 faces outwardly in a radial direction of the rotation member 2. A first direction, where magnetic field intensity is at its maximum in the magnetic field generated around the rotation member 2, corresponds to the radial direction of the rotation member 2 (i.e., Z-direction). A second direction, which is orthogonal with respect to the Z-direction and along a direction that the north magnetic polar region 5 and the south magnetic polar region 6 are circumferentially arranged, corresponds to a rotation direction of the rotation member 2 (i.e., X-direction). In this manner, the north magnetic polar regions 5 and the south magnetic polar regions 6 are arranged so that the first direction (i.e., the Z-direction) and the second direction (i.e., the X-direction) are orthogonal with each other, that is, the north magnetic polar regions 5 and the south magnetic polar regions 6 are disposed so that the first direction intersects the second direction at a right angle. A third direction, which is along a plane perpendicular to the first direction (i.e., the Z-direction) and orthogonal with respect to the second direction (i.e., the X-direction) corresponds to a Y-direction. That is, the first direction (i.e., the Z-direction), the second direction (i.e., the X-direction) and the third direction (i.e., the Y-direction) are mutually orthogonal. The first direction, the second direction and the third direction are hereinafter referred to as the Z-direction, the X-direction and the Y-direction respectively.

The magnetic field detecting portion 3 is, for example, a hall IC. More particularly, the magnetic field detecting portion 3 is the MLX 90316 available from Melexis and provided on a substrate 7. A commercially available general the MLX 90316 includes a fixed internal circuit where magnitudes of components of magnetic fields in the X-direction and in the Y-direction are detected by calculating a difference between output voltages generated on detecting elements 9a and 9b (i.e., a first pair of detecting elements 9a and 9b), and a difference between output voltages generated on detecting elements 9c and 9d (i.e., a second pair of detecting elements 9c and 9d) respectively. According to the detected magnitudes of the components of the magnetic fields in the X-direction and in the Y-direction, a direction of the magnetic field on an X-Y plane is calculated, and then a signal corresponding to a magnetic field angle is outputted. In this embodiment, for example, the internal circuit of the MLX 90316 (the hall IC) is modified and the hall IC that performs a predetermined signal processing is applied. In this embodiment, the magnetic field detecting portion 3 is positioned radially outward of the rotation member 2. As shown in FIG. 2, the detecting portion 3 includes a magnetic plate 8 being disk-shaped and having the multiple detecting elements 9 (i.e., a set of detecting elements 9a, 9b, 9c, 9d) for detecting a magnitude of a component of a magnetic field in a direction perpendicular to the magnetic plate 8. The detecting elements 9, for example, the hall elements, are positioned directly beneath end portions of the magnetic plate 8 respectively. The set of detecting elements 9 include a pair of detecting elements 9a, 9b arranged in the X-direction and another pair of detecting elements 9c, 9d arranged in the Y-direction, each being on a plane perpendicular to the Z-direction.

The magnetic field detecting portion 3 is positioned to have a structure where the magnetic plate 8 faces perpendicular to the Z-direction, that is, the magnetic field detecting portion 3 is disposed so that the magnetic plate 8 is oriented perpendicular to the first direction, for detecting the magnitudes of the components of the magnetic fields in the Z-direction and the X-direction. A principle for detecting the magnitude of the component of the magnetic field in the Z-direction by the magnetic field detecting portion 3 is described hereunder. As shown in FIG. 3A, when an external magnetic field is applied in the Z-direction, the components of the magnetic fields in the Z-direction are generated on the pair of detecting elements 9c, 9d positioned in the Y-direction. At this time, the component of the magnetic field generated on the detecting element 9c and the component of the magnetic field generated on the detecting element 9d are in same directions. Consequently, the magnitude of the component of the magnetic field, which is proportional to a magnitude of the external magnetic field, is detected by adding the output voltage of the detecting element 9c and the output voltage of the detecting element 9d.

Also, when a disturbing external magnetic field exists, it is removed in a following manner. As shown in FIG. 3B, when the disturbing external magnetic field is applied in the Y-direction, a magnetic flux is bent by the magnetic plate 8 and the components of the magnetic fields along the Z-direction are generated on the pair of detecting elements 9c, 9d. At this time, the component of the magnetic field generated on the detecting element 9c and the component of the magnetic field generated on the detecting element 9d are in opposite directions. Consequently, the disturbing external magnetic field applied in the Y-direction is cancelled out by adding the output voltage of the detecting element 9c and the output voltage of the detecting element 9d.

A principle for detecting the magnitude of the component of the magnetic field in the X-direction by means of the magnetic field detecting portion 3 is same as the principle for detecting the magnitude of the component of the magnetic field in the X-direction by means of the known angle detecting apparatus as described in FIGS. 3A and 3B. The magnetic field detecting portion 3 detects the magnitude of the component of the magnetic field in the X-direction by calculating the difference between the output voltages generated on the detecting elements 9a and 9b arranged in the X-direction.

The computing unit 4 computes a magnetic field angle θ according to a ratio of the magnitude Vz of the component of the magnetic field in the Z-direction and the magnitude Vx of the component of the magnetic field in the X-direction.

θ=Arctan(Vz/Vx)  [Formula 1]

Now, an effect of the angle detecting apparatus according to the first embodiment is described hereunder. Since the magnetic plate 8 is disk-shaped, a degree of magnetization varies depending on a direction of application of the external magnetic field. FIG. 4 shows an analysis result from a simulation on a relationship between the applied external magnetic field and a maximum magnetization of the magnetic plate 8. In FIG. 4, a symbol ◇ indicates a case where the external magnetic field is applied to the magnetic plate 8 parallel thereto. A symbol ■ indicates a case where the external magnetic field is perpendicularly applied to the magnetic plate 8. As is seen in FIG. 4, it is more difficult to induce the magnetization when the external magnetic field is perpendicularly applied to the magnetic plate 8 compared to when the external magnetic filed is parallelly applied thereto. From the result of the simulation, a magnetic intensity where the magnetic plate 8 is magnetically saturated is six times higher when the external magnetic field is perpendicularly applied thereto compared to when the external magnetic field is parallelly applied thereto.

When a magnetic field having an excessive magnetic intensity is applied to the magnetic field detecting portion 3, the magnetic plate 8 becomes magnetically saturated and unable to generate, in the direction perpendicular to the magnetic plate 8, the magnetic field having the intensity that is proportional to the applied external magnetic field. Presuming from the results shown in FIG. 4, when the magnetic field detecting portion 3 is positioned so that the magnetic plate 8 faces perpendicular to the Z-direction (refer to FIG. 1), it is considered that the magnetic field detecting portion 3 has a maximum allowable magnetic field of a higher magnetic field intensity.

Figure 5A:
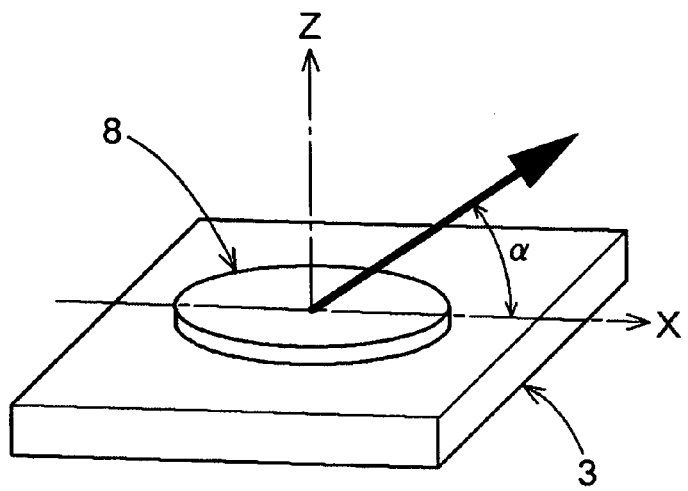
FIG. 5A is a diagram showing an angle of an applied magnetic field and FIG. 5B is a graph showing a relationship between the angle of the magnetic field and the magnetic field.
Figure 5B:
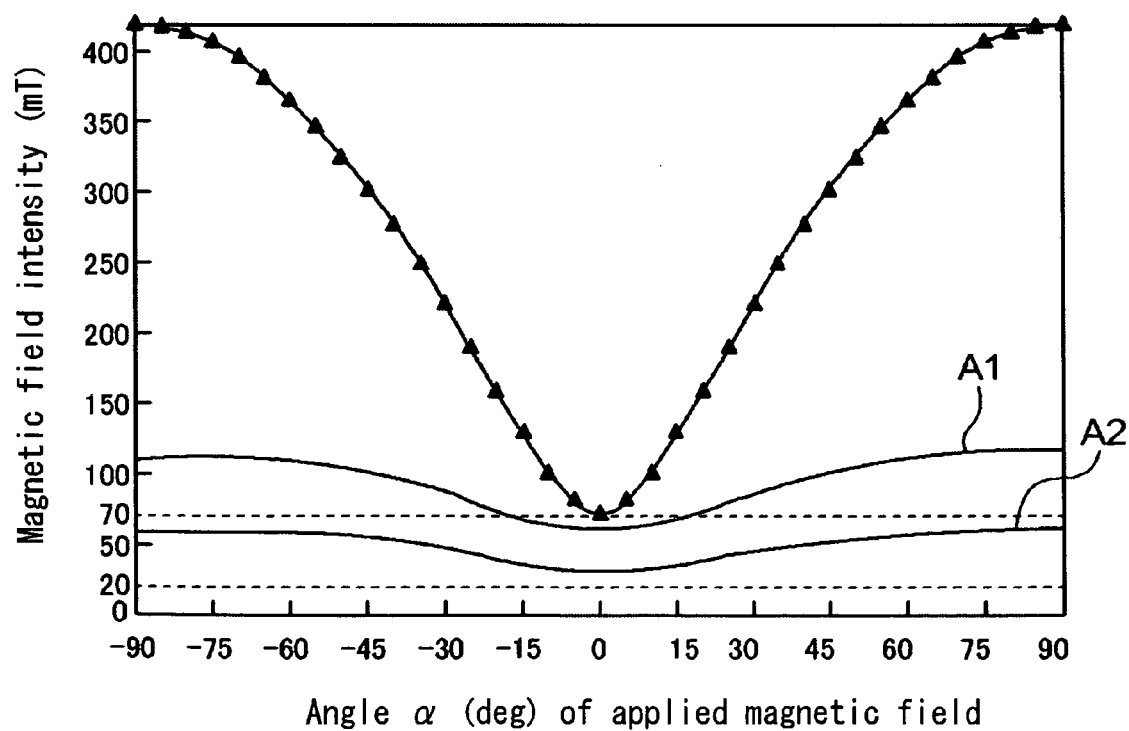
Figure 20:
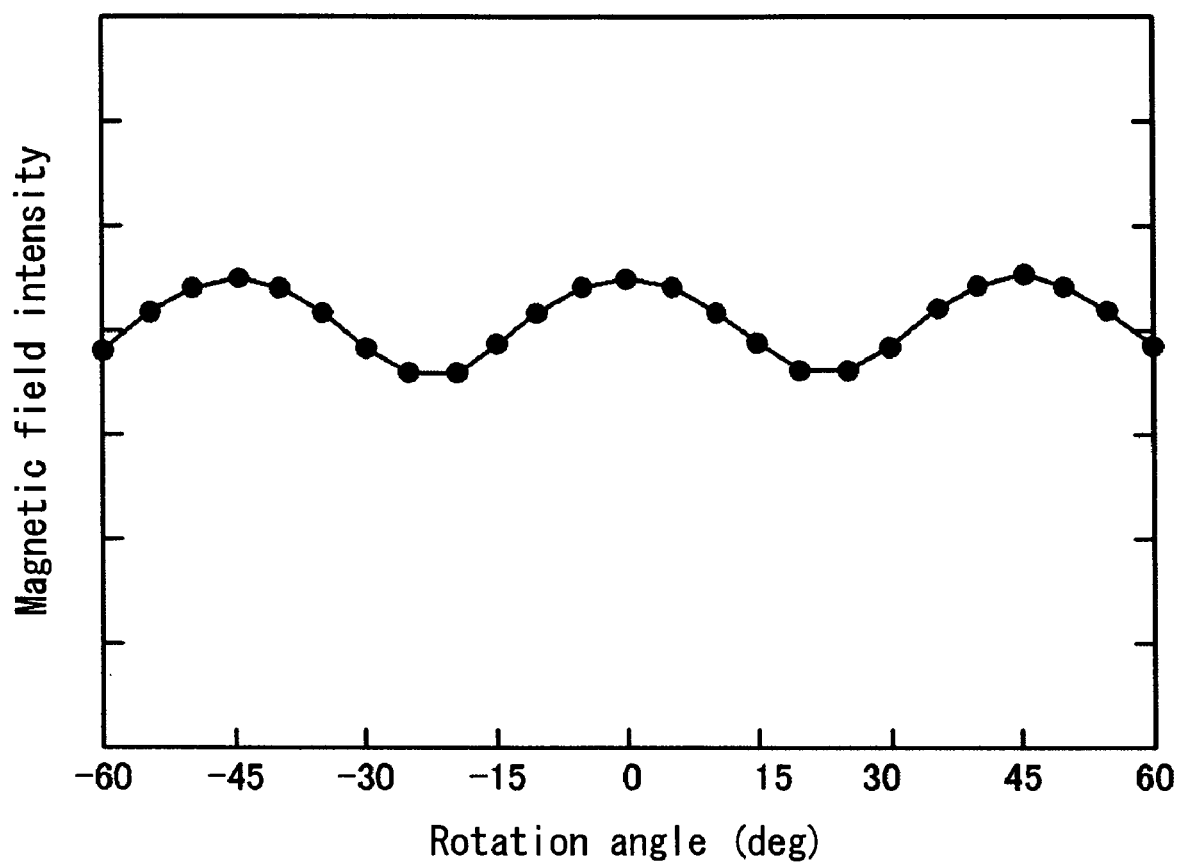
FIG. 20 is a graph showing a relationship between the rotation angle of the rotation member and the magnetic field intensity.

Based on the results shown in FIG. 4, the maximum allowable magnetic field of the magnetic field detecting portion 3 is calculated when the magnetic field detecting portion 3 is positioned so that the magnetic plate 8 faces perpendicular to the Z-direction. The calculation results of the maximum allowable magnetic field of the magnetic field detecting portion 3 are shown in FIG. 5B. In FIG. 5B, a symbol ▲ indicates the maximum allowable magnetic field of the magnetic field detecting portion 3 when the magnetic field is applied thereto, varying an application angle α of the magnetic field. The application angle α of the magnetic field, at which the magnetic field is applied to the magnetic field detecting portion 3, is shown in FIG. 5A. When the application angle α of the magnetic field is at 0 degrees (indicated by the symbol ▲ in FIG. 5B), the maximum allowable magnetic field of the magnetic field detecting portion 3 is at an upper limit (70 mT) of an ideal range of the magnetic field intensity for the magnetic field detecting portion 3 to operate. The application angle α at this time, that is 0 degrees, is obtained when the magnetic field detecting portion 3 is positioned so as to face the boundary portion between the north magnetic polar region 5 and the south magnetic polar region 6 (i.e., when the rotation angle of the rotation member 2 is ±22.5 degrees) in FIGS. 1A and 1B. This rotation angle corresponds to a rotation angle at which the magnetic intensity of the magnetic field detecting portion 3 is at its minimum as shown in FIG. 20. When the application angle α of the magnetic field is at −90 degrees or +90 degrees (indicated by the symbol ▲ in FIG. 5B), the maximum allowable magnetic field is six times a value of the upper limit of the ideal range of the magnetic field intensity for the magnetic field detecting portion 3 to operate (420 mT). The application angle α at this time, that is −90 degrees or +90 degrees, is obtained when the magnetic field detecting portion 3 is positioned so as to face the circumferentially central portion of the north magnetic polar region 5 or of the south magnetic polar region 6 (i.e., when the rotation angle of the rotation member 2 is 0 degrees or ±45 degrees) in FIGS. 1A and 1B. This rotation angle corresponds to a rotation angle at which the magnetic intensity of the magnetic field detecting portion 3 is at its maximum as shown in FIG. 20.

As described above, by positioning the magnetic field detecting portion 3 so that the magnetic plate 8 faces perpendicular to the Z-direction, the maximum allowable magnetic field of the magnetic field detecting portion 3 has a higher magnetic field intensity when the application angle α of the magnetic field is other angles than 0 degrees.

Consequently, an operating magnetic field (indicated as A1 in FIG. 5B) of the magnetic field detecting portion 3 may be set between the maximum allowable magnetic field (indicated by the symbol ▲ in FIG. 5B) and a lower limit (20 mT) of the ideal range of the magnetic field intensity. In the known angle detecting apparatus, an operating magnetic field (indicated as A2 in FIG. 5B) of the magnetic field detecting portion is set in a range of the magnetic field intensity between 20 mT and 70 mT. The operating magnetic field (indicated as A1 in FIG. 5B) of the magnetic field detecting portion 3 according to the first embodiment is twice the operating magnetic field of the known angle detecting apparatus. This allows the operating magnetic field of the magnetic field detecting portion 3 to have the higher magnetic field intensity, thereby improving detection accuracy and reducing cost. In addition, a distance between a surface of the north magnetic polar region 5 or the south magnetic polar region 6, and the magnetic field detecting portion 3 is reduced and there is no need for constituting the north magnetic polar region 5 and the south magnetic polar region 6 with rare-earth magnet or the like having higher magnetic intensity, resulting in reduction of the cost and a size.

Figure 6:
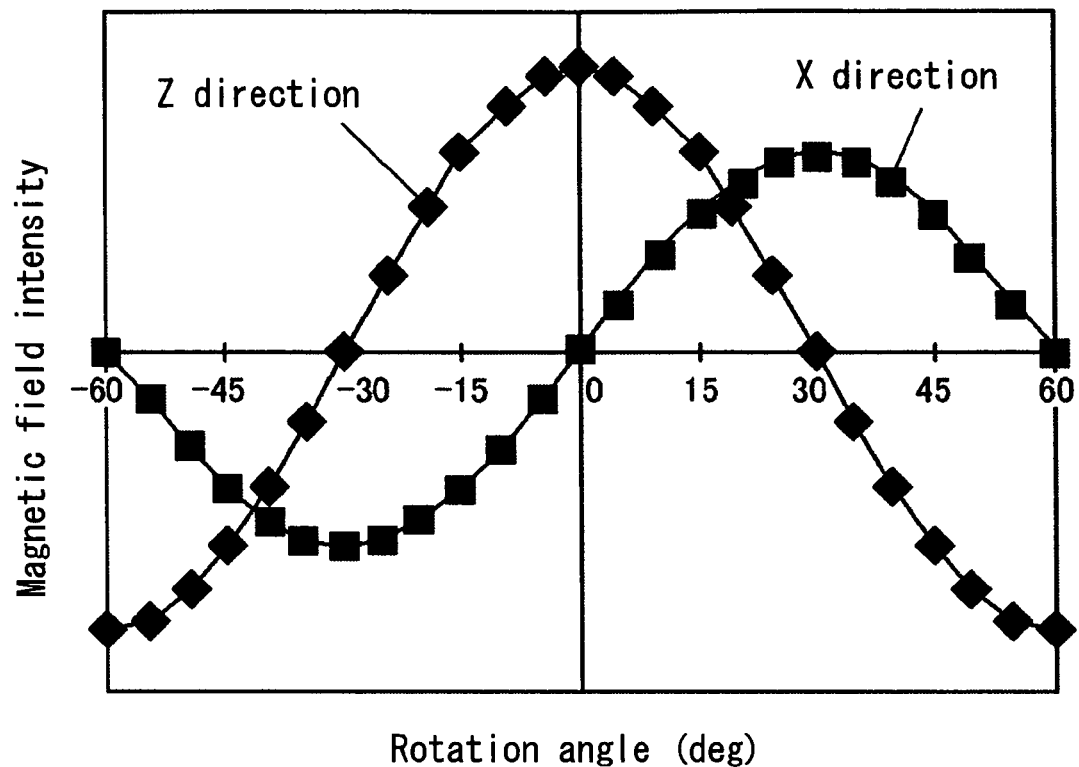
FIG. 6 is a graph showing a relationship between rotation angles of a rotation member and magnetic field intensity.

As shown in FIG. 6, the magnitude of the component of the magnetic field (i.e., magnetic field intensity) applied to the magnetic field detecting portion 3 by the magnetic field generated around the rotation member 2 differs between the Z-direction (indicated by the symbol ◇ in FIG. 6) and the X-direction (indicated by the symbol □ in FIG. 6). FIG. 6 shows a result of a simulation performed on the rotation member 2 provided with each three of the north magnetic polar regions 5 and the south magnetic polar regions 6 with intervals of 60 degrees therebetween.

The result of the simulation shows that an intensity ratio of the magnetic field in the Z-direction (indicated by the symbol ◇ in FIG. 6) to the magnetic field in the X-direction (indicated by the symbol □ in FIG. 6) is 1.41 (i.e., the magnitude of the magnetic field component in the Z-direction divided by the magnitude of the magnetic field component in the X-direction).

When the external magnetic field is applied to the magnetic plate 8 parallel thereto, the magnetic field is generated on the detecting elements 9a, 9b in the direction perpendicular to the magnetic plate 8 due to a large effect of magnetic flux concentration of the magnetic plate 8. The intensity of the generated magnetic field on the detecting elements 9c, 9d is 1.8 times higher than the intensity of the external magnetic field applied to the magnetic plate 8. In contrast, when the external magnetic field is applied to the magnetic plate 8 perpendicular thereto, the effect of the magnetic flux concentration of the magnetic plate 8 is smaller and the magnetic field, of which the intensity is 1.2 times higher than the intensity of the external magnetic field, is generated on the detecting elements 9 in the direction perpendicular to the magnetic plate 8. As described above, a sensitivity of the magnetic field detecting portion 3 varies according to an application direction of the external magnetic field. A sensitivity ratio of the magnetic field detecting portion 3 derived from the simulation result is 1.48 (i.e., a sensitivity in a direction parallel to the magnetic plate 8 divided by a sensitivity in the perpendicular direction to the magnetic plate 8).

Figure 7:
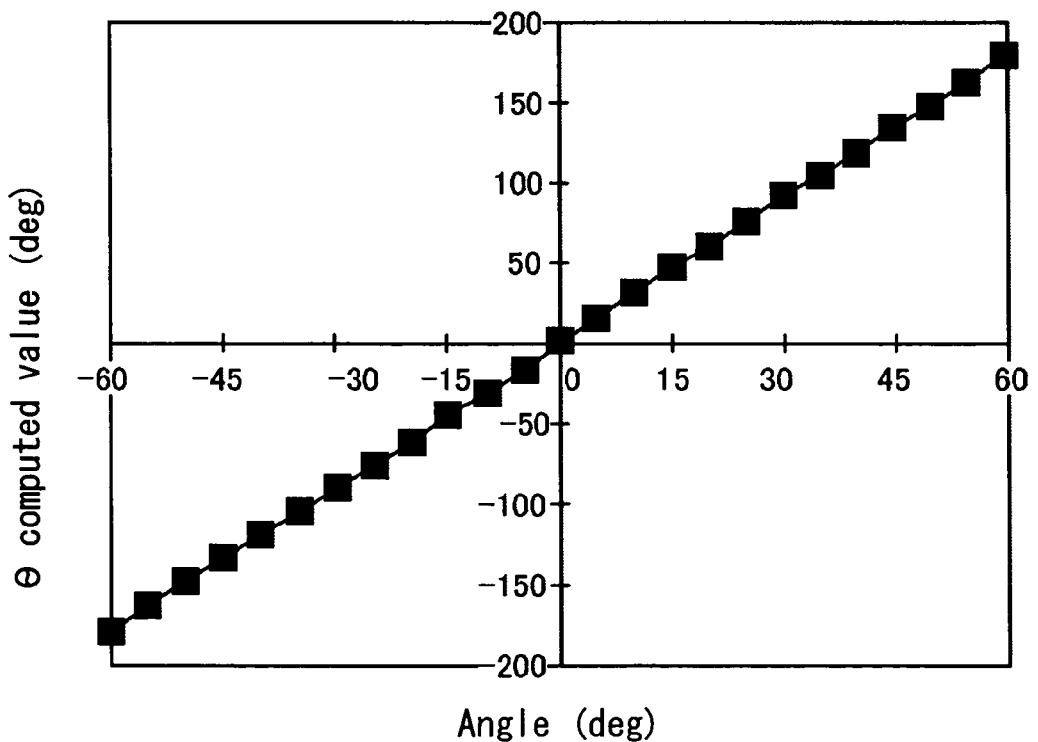
FIG. 7 is a graph showing a relationship between angles and calculation values of the angle detection apparatus.

Hence, in the first embodiment of the present invention, the magnetic field detecting portion 3 is positioned so that the magnetic plate 8 faces perpendicular to the Z-direction and the external magnetic field is applied to the magnetic plate 8 perpendicular thereto. Consequently, the intensity ratio of the magnetic field (1.41) and the sensitivity ratio of the magnetic field detecting portion 3 (1.48) balance each other out, thus a sensitivity of the angle detecting apparatus becomes substantially one. As shown in FIG. 7, the angle detecting apparatus according to this embodiment provides an improved linearity of the computed value θ computed by the computing unit 4 relative to the rotation angle of the rotation member 2, thereby improving the detection accuracy.

Next, description is made on results of simulations of the magnetic field intensity (a magnetic flux density) detected by the magnetic field detecting portion 3 when the polar anisotropic magnet is used and when the radial anisotropic magnet is used as the rotation member 2, respectively. In a model used in the simulation, the rotation member 2 is the ring shaped magnet having an outer diameter of 21 mm (an outer radius of 10.5 mm), an inner diameter of 16.8 mm (an inner radius of 8.4 mm) and a thickness of 7 mm, and to include four north magnetic polar regions 5 and four south magnetic polar regions 6 alternatively arranged at a constant pitch.

Figure 9A:
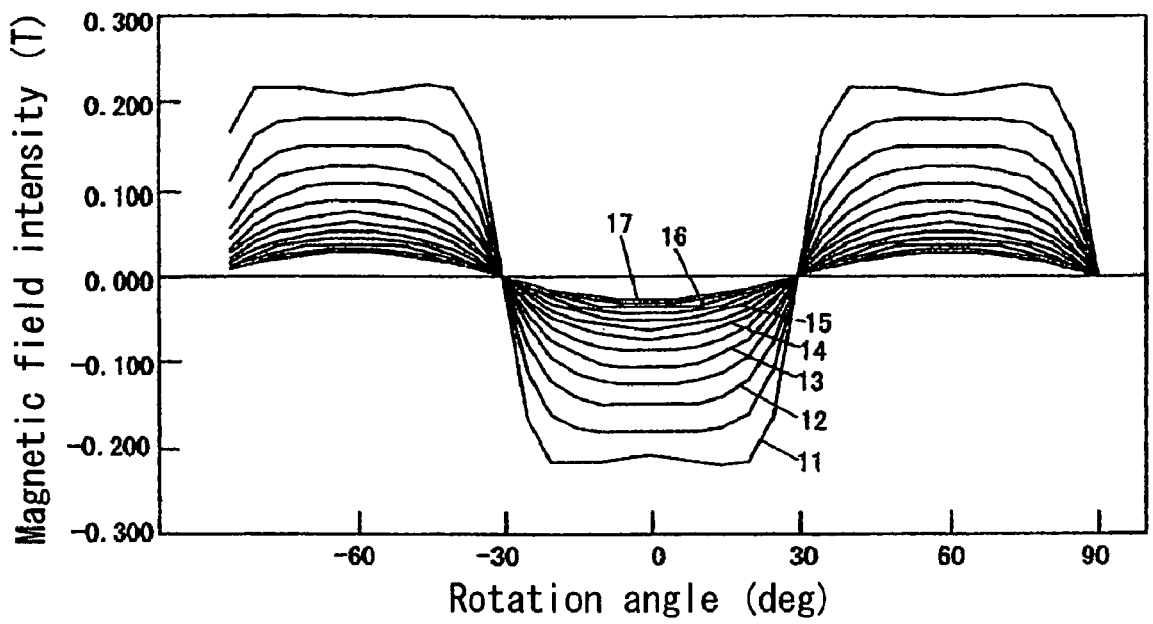
FIG. 9 is a diagram showing magnetic field distribution when a polar anisotropic magnet is used.
Figure 9B:
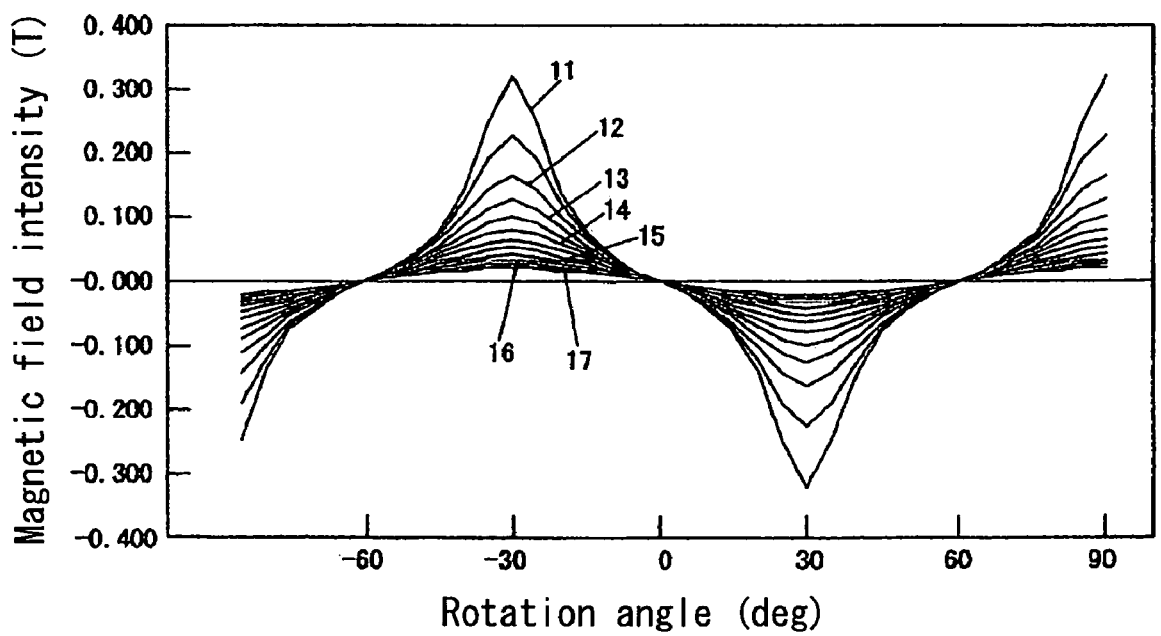
Figure 10A:
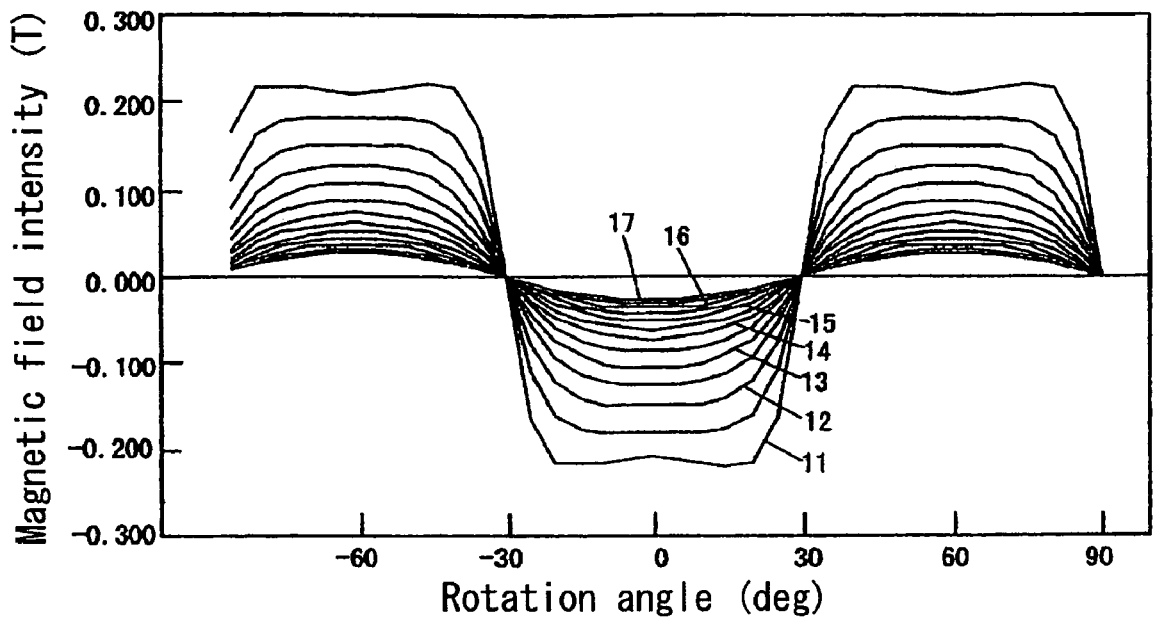
FIG. 10 is a diagram showing magnetic field distribution when a radial anisotropic magnet is used.
Figure 10B:
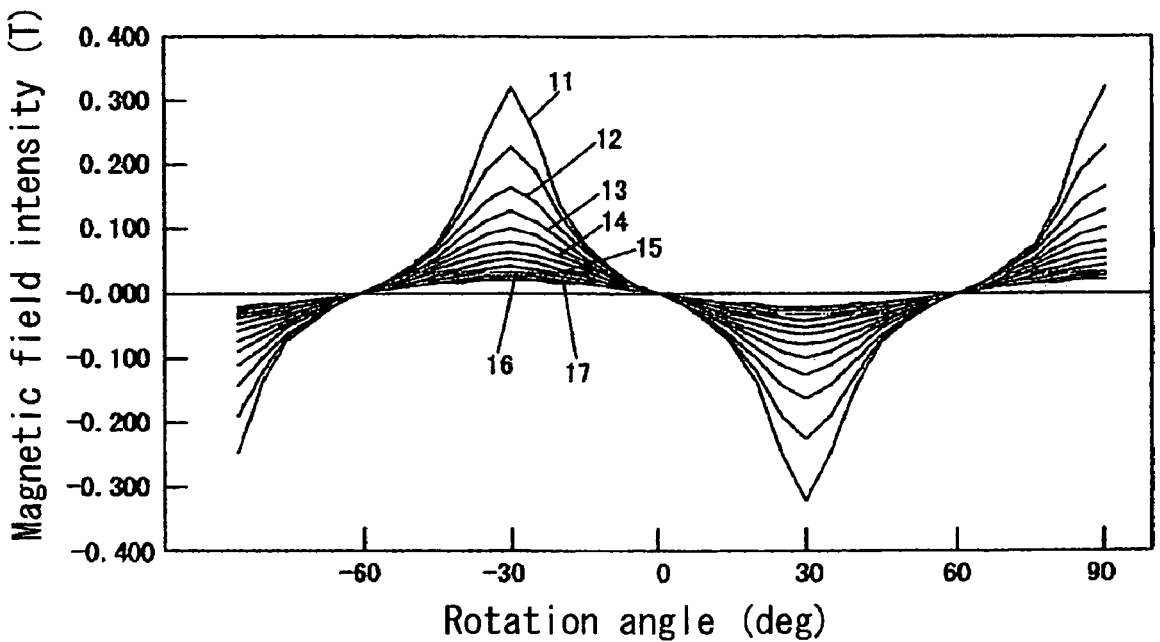

FIG. 9A shows a result of the simulation of changes in the magnetic field intensity in the Z-direction as the rotation member 2 rotates when the polar anisotropic magnet is used as the rotation member 2. FIG. 9B shows a result of the simulation of changes in the magnetic field intensity in the X-direction as the rotation member 2 rotates. FIG. 10A shows the result of a simulation of changes in the magnetic field intensity in the Z-direction as the rotation member 2 rotates when the radial anisotropic magnet is used as the rotation member 2. FIG. 10B shows a result of the simulation of changes in the magnetic field intensity in the X-direction as the rotation member 2 rotates. Values indicated in FIGS. 9A to 10B correspond to a distance (unit: mm) between a center of the rotation member 2 and the magnetic field detecting portion 3.

As is clear from FIGS. 9A and 9B, when the polar anisotropic magnet is used as the rotation member 2, distributions of the magnetic intensity in the Z-direction and the X-direction have substantial sinusoidal waveforms regardless of the distance between the center of the rotation member 2 and the magnetic field detecting portion 3. When the radial anisotropic magnet is used as the rotation member 2, however, the distribution of the magnetic intensity becomes more sinusoidal as the distance between the center of the rotation member 2 and the magnetic field detecting portion 3 increases, as is clear from FIGS. 10A and 10B. However, when the distance between the center of the rotation member 2 and the magnetic field detecting portion 3 is less than 14 mm, the distribution of the magnetic intensity in the Z-direction has a square waveform and the distribution in the X-direction has a triangle waveform respectively.

Figure 11A:
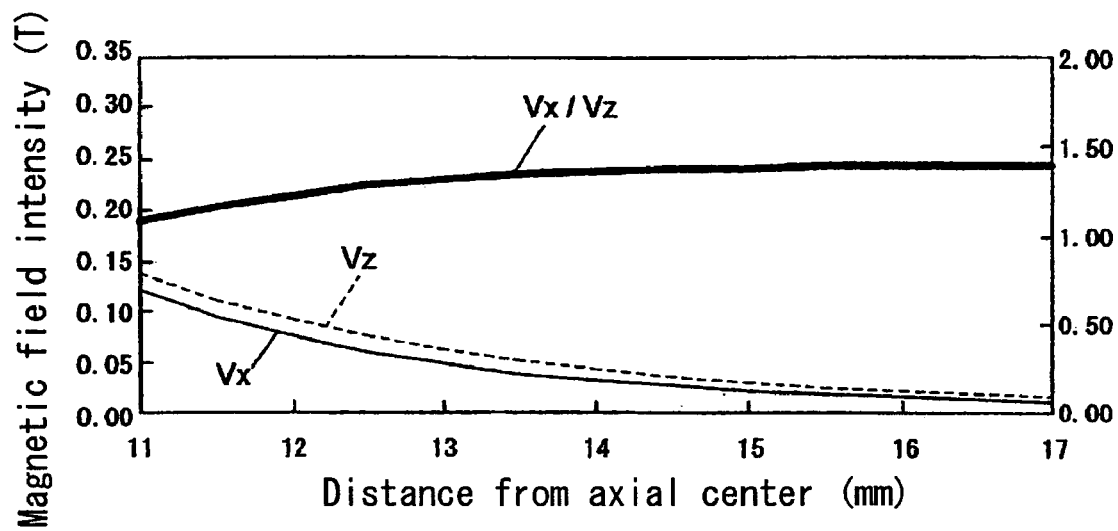
FIG. 11 is a diagram showing a relationship between distance from the rotation member and the ratio of magnetic field intensity.
Figure 11B:
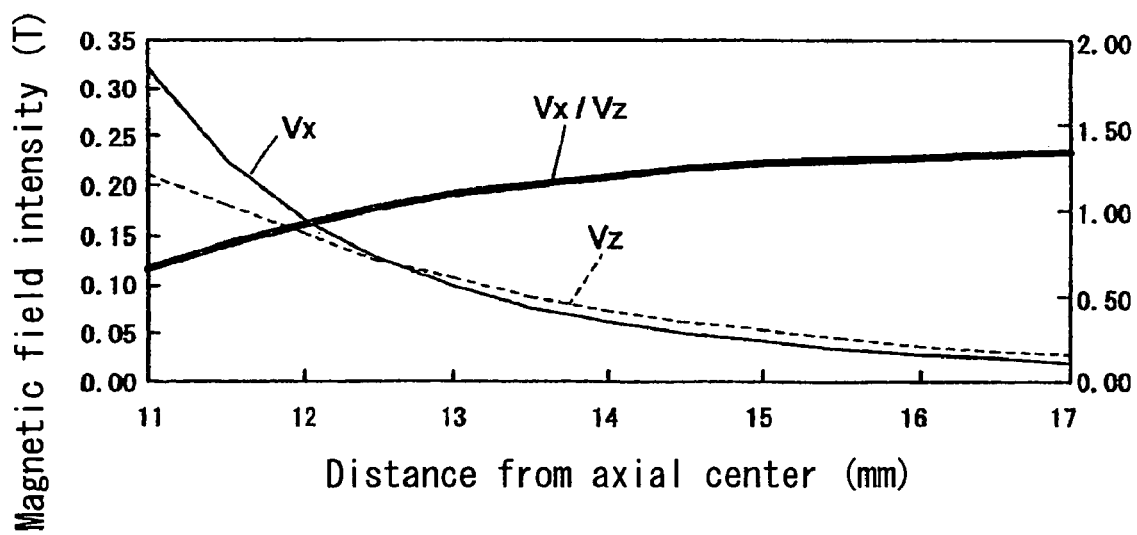

FIGS. 11A and 11B show an amplitude of the magnetic field intensity in the Z-direction, an absolute amplitude of the magnetic field intensity in the X-direction, and the ratio of the amplitude of the magnetic field intensity in the Z-direction and the amplitude of the magnetic field intensity in the X-direction (hereinafter referred to as a ratio of the magnetic field intensity). FIG. 11A shows a result when the polar anisotropic magnet is used as the rotation member 2 and FIG. 11B shows a result when the radial anisotropic magnet is used as the rotation member 2.

As is clear from FIG. 11A, when the polar anisotropic magnet is used as the rotation member 2, the ratio of the magnetic field intensity increases as the distance between the center of the rotation member 2 and the magnetic field detecting portion 3 increases, and stays substantially constant at 1.4 when the distance is 14 mm or longer. As is clear from FIG. 11B, when the radial anisotropic magnet is used as the rotation member 2, the ratio of the magnetic field intensity increases as the distance between the center of the rotation member 2 and the magnetic field detecting portion 3 increases, and stays substantially constant at 1.4 when the distance is 16 mm or longer.

As is clear from FIGS. 11A and 11B, when the distance between the center of the rotation member 2 and the magnetic field detecting portion 3 increases from 11 mm to 14 mm, the ratio of the magnetic field intensity gradually increases from 1.2 to 1.4 when the polar anisotropic magnet is used as the rotation member 2. On the other hand, when the radial anisotropic magnet is used as the rotation member 2, the ratio of the magnetic field intensity sharply increases from 0.6 to 1.4. That is, the change in the ratio of the magnetic field intensity is slower when the polar anisotropic magnet is used as the rotation member 2 than when the radial anisotropic magnet is used. The difference in the behaviors of the magnetic field intensity between when the polar anisotropic magnet is used and when the radial anisotropic magnet is used becomes more significant as the distance between the center of the rotation member 2 and the magnetic field detecting portion 3 decreases.

Figure 12A:
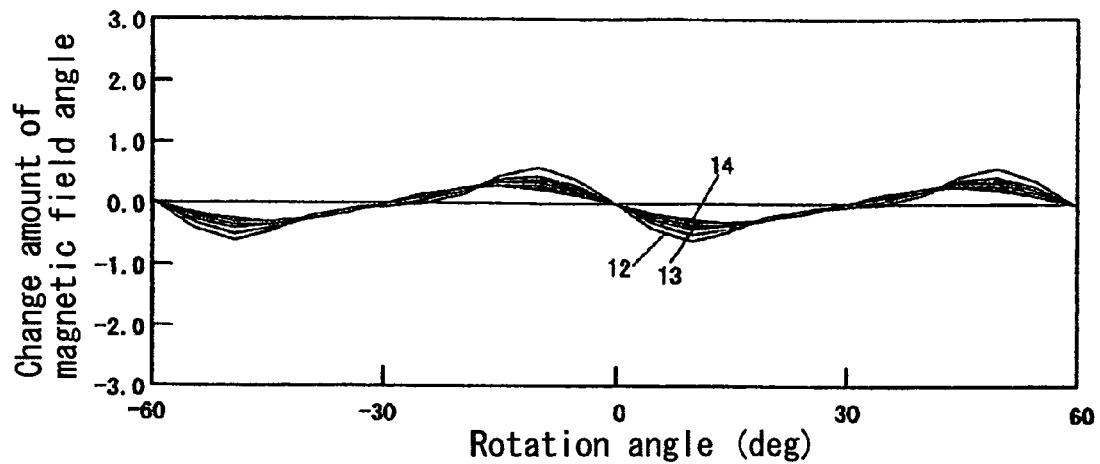
FIG. 12 is a diagram showing change of magnetic field direction when the distance from the rotation member is changed.
Figure 12B:
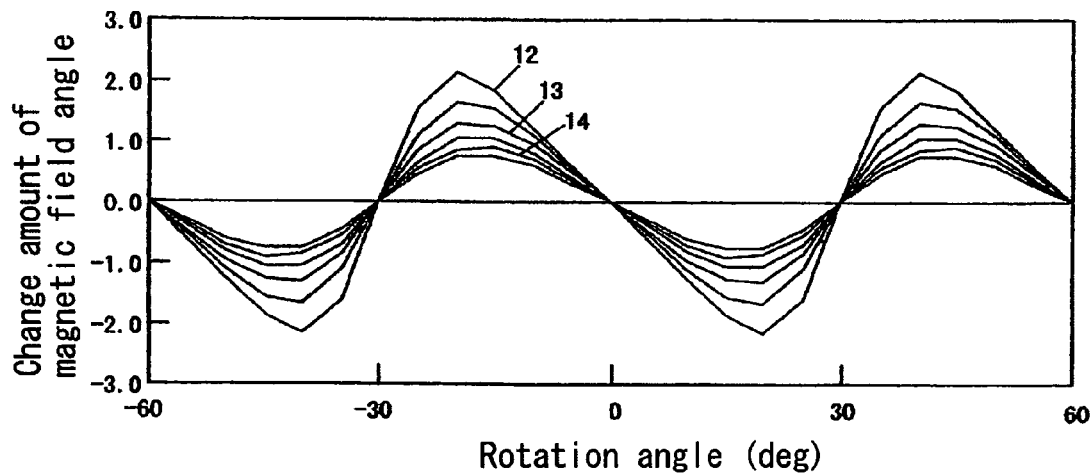

FIGS. 12A and 12B show a change amount of the magnetic field angle around the rotation member 2 when the distance between the center of the rotation member 2 and the magnetic field detecting portion 3 increases from a predetermined reference distance (unit: mm) by 0.5 mm. Values in the drawings indicate distances before the increment (i.e., the predetermined reference distance). FIG. 12A shows a result when the polar anisotropic magnet is used as the rotation member 2 and the FIG. 12B shows a result when the radial anisotropic magnet is used.

As is clear from FIG. 12A, the change amount of the magnetic field angle is less than 1.0 degree in all the cases when the polar anisotropic magnet is used as the rotation member 2. On the other hand, the change amount of the magnetic field angle is larger when the radial anisotropic magnet is used as the rotation member 2 than when the polar anisotropic magnet is used. In particular, the more predetermined reference distance decreases, the more the change amount increases.

For improving the linearity of the computed value θ computed by the computing unit 4 relative to the rotation angle of the rotation member 2 as described above, it is necessary to perform corrective actions. The corrective actions include setting the sensitivity ratio of the magnetic field detecting portion 3 so that the intensity ratio and the sensitivity ratio of the magnetic field detecting portion 3 balance each other out. Another corrective action would be multiplying a coefficient by one of the intensities of the magnetic field in the Z and X directions in order to obtain the intensity ratio of one. From a viewpoint of the corrective actions, it is easier to use the polar anisotropic magnet than to use the radial anisotropic magnet as the rotation member 2 since the intensity ratio shows little changes even when the distance between the center of the rotation member 2 and the magnetic field detecting portion 3 changes, as shown in FIG. 11A. Difference in ease of the corrective actions between when the polar anisotropic magnet is used and when the radial anisotropic magnet is used is especially prominent when the distance between the center of the rotation member 2 and the magnetic field detecting portion 3 is small.

As is clear from the results shown in FIGS. 12A and 12B, by using the polar anisotropic magnet as the rotation member 2, changes in a direction of the magnetic field caused when the distance between the center of the rotation member 2 and the magnetic field detecting portion 3 changes is reduced. By using the polar anisotropic magnet as the rotation member 2, therefore, variations in detection results caused by an assembly error of the angle detecting apparatus are reduced. Further, even when a radial distance between the rotation member 2 and the magnetic field detecting portion 3 changes due to runout of the rotation shaft 1 during operation of the angle detecting apparatus, the variations in the detection results are reduced. When the distance between the center of the rotation member 2 and the magnetic field detecting portion 3 is small, in particular, the variations in the detection results are reduced by using the polar anisotropic magnet as the rotation member 2.

Figure 13:
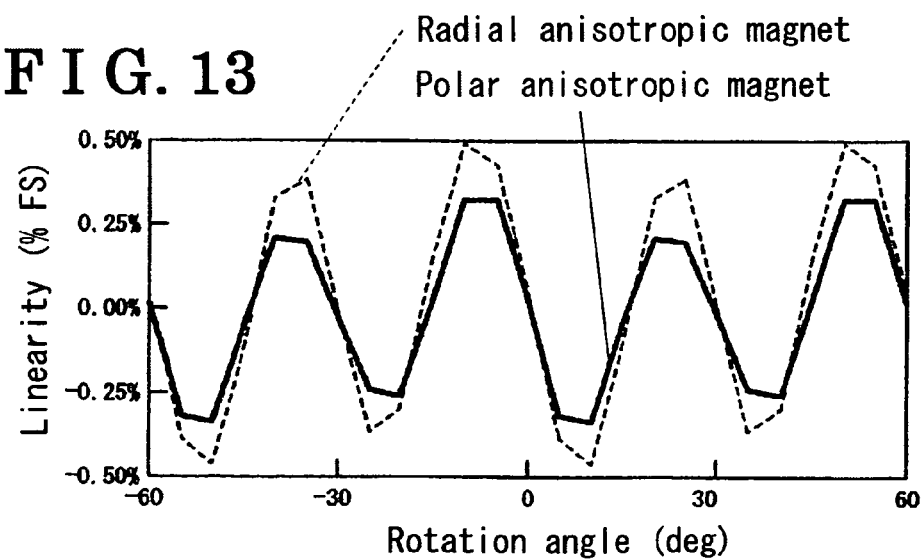
FIG. 13 is a diagram showing linearity between rotation angles and calculated angles.

FIG. 13 shows the linearity, after the above-mentioned corrective actions are performed, of the rotation angle of the rotation member 2 relative to the detected angle detected by the angle detecting apparatus. In FIG. 13, the coefficient for the correction is 1.6 when the polar anisotropic magnet is used and 20.5 when the radial anisotropic magnet is used as the rotation member 2. The distance between the center of the rotation member 2 and the magnetic field detecting portion 3 is set to be 12.5 mm. As a linearity reference, a percent full scale value is used for indicating a difference between an ideal linear curve and an actual relationship in terms of the rotation angle of the rotation member 2 and the direction of the magnetic field at each rotation angle. The ideal linear curve is derived based on collinear approximation of the relationship of the rotation angle of the rotation member 2 and the direction of the magnetic field. As shown in FIG. 13, a better linearity is obtained when the polar anisotropic magnet is used as the rotation member 2. Based on the result, it is verified that the corrective actions are more easily performed when the polar anisotropic magnet is used as the rotation member 2.

As described above, by using the polar anisotropic magnet as the rotation member 2, the angle detecting apparatus is reduced in size while maintaining the detection accuracy. As shown in FIGS. 9A and 9B, the distribution of the magnetic intensity of the polar anisotropic magnet is sinusoidal. The similar effect is obtained when the isotropic magnet is used as the rotation member 2, the isotropic magnet being magnetized so that the distribution of the flux density is sinusoidal over its surface that faces the magnetic field detecting portion 3. Since the isotropic magnets are generally less costly than the polar anisotropic magnets, a production cost is reduced by using the isotropic magnet as the rotation member 2.

Second Embodiment

Figure 14:
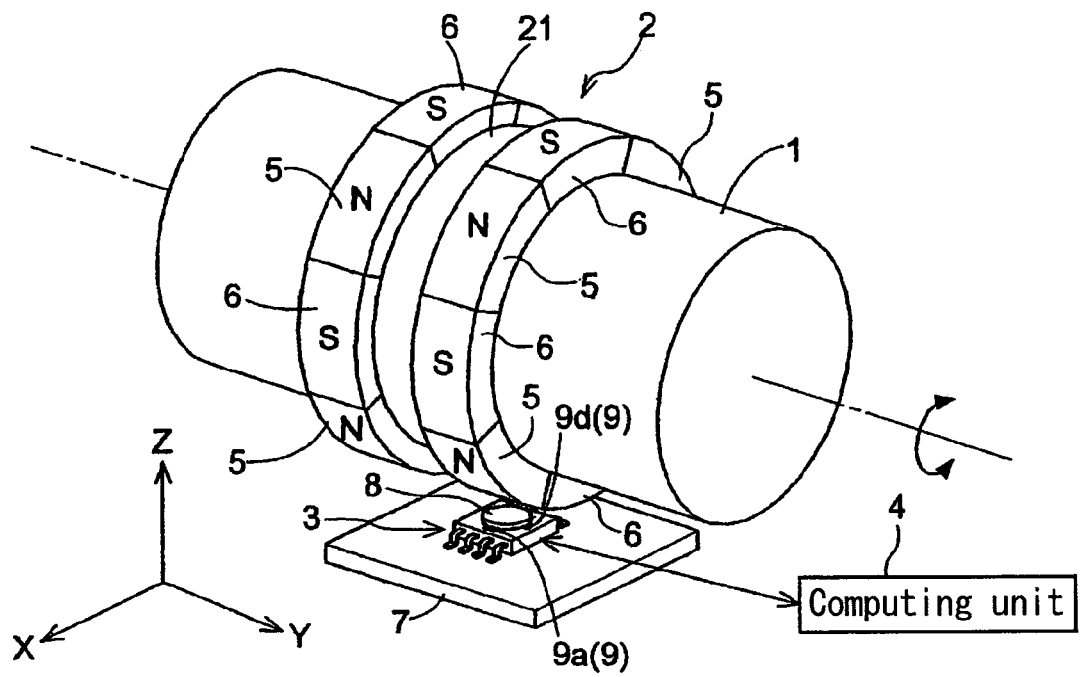
FIG. 14 is a perspective view of the angle detection apparatus according to a second embodiment.

A second embodiment is an alternative embodiment in which the form of the rotation member 2 in the first embodiment is modified. As shown in FIG. 14, in this embodiment, a groove 21 is formed at an outer peripheral surface of the rotation member and extends in a circumferential direction of the rotation member 2. More specifically, the groove 21 is positioned at a center portion of the outer peripheral surface with respect to a Y-axis direction (thrust direction) and is formed over an entire circumference of the outer peripheral surface. In the embodiment, the groove 21 presents a square shape when viewed in a cross section in a direction perpendicular to a direction that the groove 21 extends. However, the form of the groove 21 is not limited to the above-described square shape. The groove 21 may be formed in a different shape such as an arch shape, a semi-arch shape, a triangle shape, and a stepwise shape.

Next, the result of simulation, indicating influence of relative position change between the rotation member 2 and the magnetic field detecting portion 3 on the detection result of the magnetic field angle, will be described. In the simulation, the rotation member 2 with the groove 21 and the rotation member 2 without the groove 21 are used for comparison. In a model used in the simulation, the rotation member 2 is a ring shaped magnet having an outer diameter of 10.3 mm (an outer radius of 5.15 mm), an inner diameter of 8.2 mm (an inner radius of 4.1 mm), and a thickness of 5.0 mm (width with respect to the thrust direction). In the magnet, four north magnetic polar regions N and four south magnetic polar regions S are alternately provided at a constant pitch. The groove 21 is formed to be 1 mm wide and 1 mm in depth. In the width direction thereof, the groove 21 is formed in a manner to extend to 0.5 mm above and 0.5 mm below from a center portion of the rotation member 2, viewed in a thickness direction of the rotation member 2, and is positioned so that a width center line of the groove 21 lies on a thickness center line of the rotation member 2. An initial position of the magnetic field detecting portion 3 is set so that a radial position thereof is 12.5 mm apart from the center of the rotation member 2 and a thrust position is at the thickness center portion of the rotation member 2.

Figure 15A:
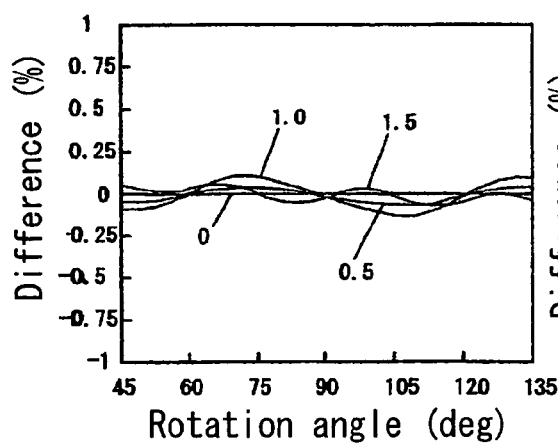
FIGS. 15A and 15B are diagrams showing detection result change when the magnetic field detecting portion is displaced in a thrust direction.
Figure 15B:
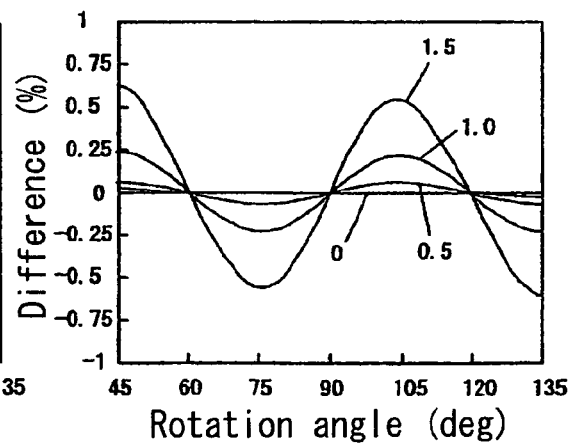

FIGS. 15A and 15B show the result of simulation conducted when the magnetic field detecting portion 3 is displaced relative to the rotation member 2 in the thrust direction. FIG. 15A shows the result when the rotation member 2 with the groove 21 is used. FIG. 15B shows a result when the rotation member 2 without the groove 21 is used. In these figures, the change amount of the magnetic field angle from the initial position, which is measured at each rotation angle when the magnetic detecting portion 3 is displaced from the initial position in the thrust direction, is indicated by % values. As illustrated in FIGS. 15A and 15B, when the magnetic field detecting portion 3 is displaced by 1.5 mm, in case that the groove 21 is not provided at the rotation member 2, the change amount of the magnetic angle is 0.5% and above. On the other hand, in case that the groove 21 is formed at the rotation member 2, the change amount of the magnetic angle is 0.25% and below. Namely, the change amount is significantly reduced, compared to the rotation member 2 without the groove 21. Accordingly, forming the groove 21 at the rotation member 2 prevents the detection result from changing due to displacement of the magnetic field detecting portion 3 relative to the rotation member 2 in the thrust direction.

Figure 16:
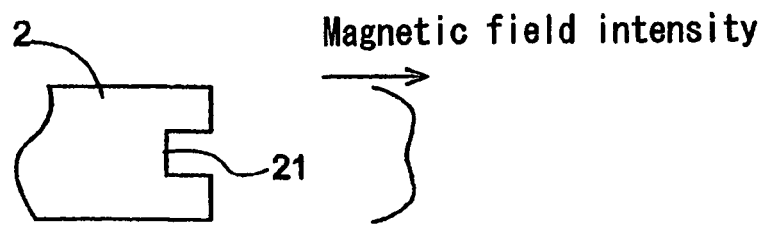
FIGS. 16A and 16B are schematic views showing magnetic field distribution in the thrust direction of the rotation member.
Figure 16:
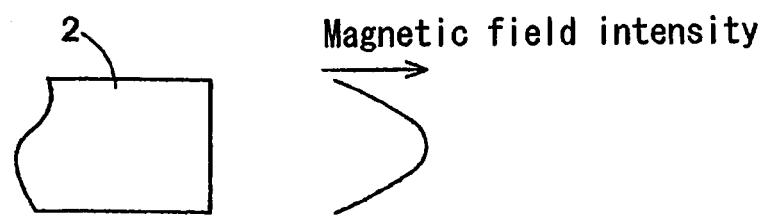

FIGS. 16A and 16B are schematic views indicating the magnetic intensity distribution in the thrust direction of the rotation member 2. FIG. 16A shows a case that the groove 21 is provided at the rotation member 2, and FIG. 16B shows a case that the groove 21 is not provided at the rotation member 2. When the groove 21 is not provided at the rotation member 2, the magnetic field intensity becomes highest around the center portion of the rotation member 2 and becomes smaller sharply towards the both ends thereof. On the other hand, when the groove 21 is provided at the rotational member 2, the magnetic field intensity becomes relatively small around the center portion of the rotation member 2. Thus, even if the magnetic field detection portion 3 is displaced in the trust direction, the change amount of the magnetic field intensity is maintained at a low level.

As described above, the magnetic field detecting portion 3 detects the magnetic angle by detecting the magnetic field intensities in the two directions. However, when the magnetic field detecting portion 3 is displaced in the thrust direction, the magnetic field intensity changes differ between the two directions. Thus, if the magnetic field detecting portion 3 is displaced in the thrust direction, the detection result of the magnetic angle is supposedly changed. Hence, the groove 21 is formed at the rotation member 2 to reduce the change amount of the magnetic field intensity in conjunction with the displacement of the magnetic field detecting portion 3 in the thrust direction, thereby reducing the change amount of the detecting result detected during the displacement of the magnetic field detecting portion 3 in the thrust direction. Meanwhile, the magnetic field intensity becomes substantially constant in the region where the groove 21 is formed. Therefore, it is advantageous to dispose the magnetic field detecting portion 3 and the rotation member 2 so as to face each other in the region where the groove 21 is formed.

Figure 17:
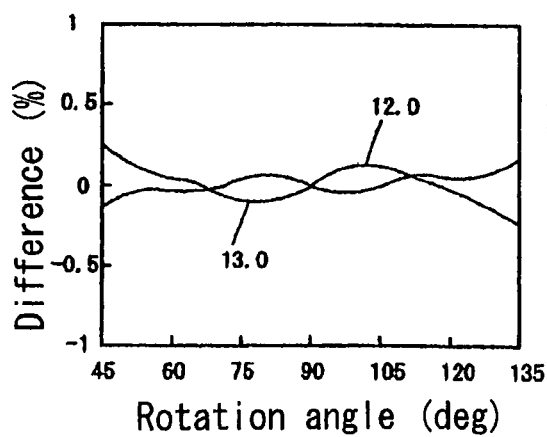
FIGS. 17A and 17B are diagrams showing detection result changes when the magnetic field detecting portion is displaced in a radial direction.
Figure 17:
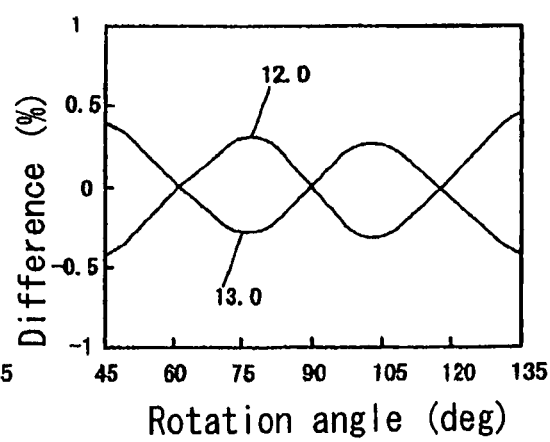

Further, FIGS. 17A and 17B show the result of simulation conducted when the magnetic field detecting portion 3 is displaced in a radial direction. FIG. 17A shows the result when the rotation member 2 with the groove 21 is used. FIG. 17B shows the result when the rotation member 2 without the groove 21 is used. Similarly to FIGS. 15A and 15B, the change amount of the magnetic field angle from the initial position is indicated by % values. As illustrated in FIGS. 17A and 17B, when the magnetic field detecting portion 3 is displaced by 1.5 mm, in case that the groove 21 is not provided at the rotation member 2, the maximum value of the change amount of the magnetic field angle is approximately 0.5%. On the other hand, in case that the groove 21 is formed at the rotation member 2, the maximum value of the change amount of the magnetic field angle is approximately 0.25%. The change amount is reduced, compared to the rotation member 2 without the groove 21. Accordingly, forming the groove 21 at the rotation member 2 prevents the detection result from changing by displacing the magnetic field detecting portion 3 relative to the rotation member 2 in the radial direction.

As described above, forming the groove 21 on the outer peripheral surface of the rotation member 2 reduces the influence on the detection result of the magnetic field detecting portion 3 when the magnetic field detecting portion 3 is displaced in the thrust or radial direction.

Third Embodiment

A third embodiment is an alternative embodiment in which the arrangement of the north magnetic polar regions 5 and the south magnetic polar regions 6 in the rotation member 2 is modified.

Figure 18A:
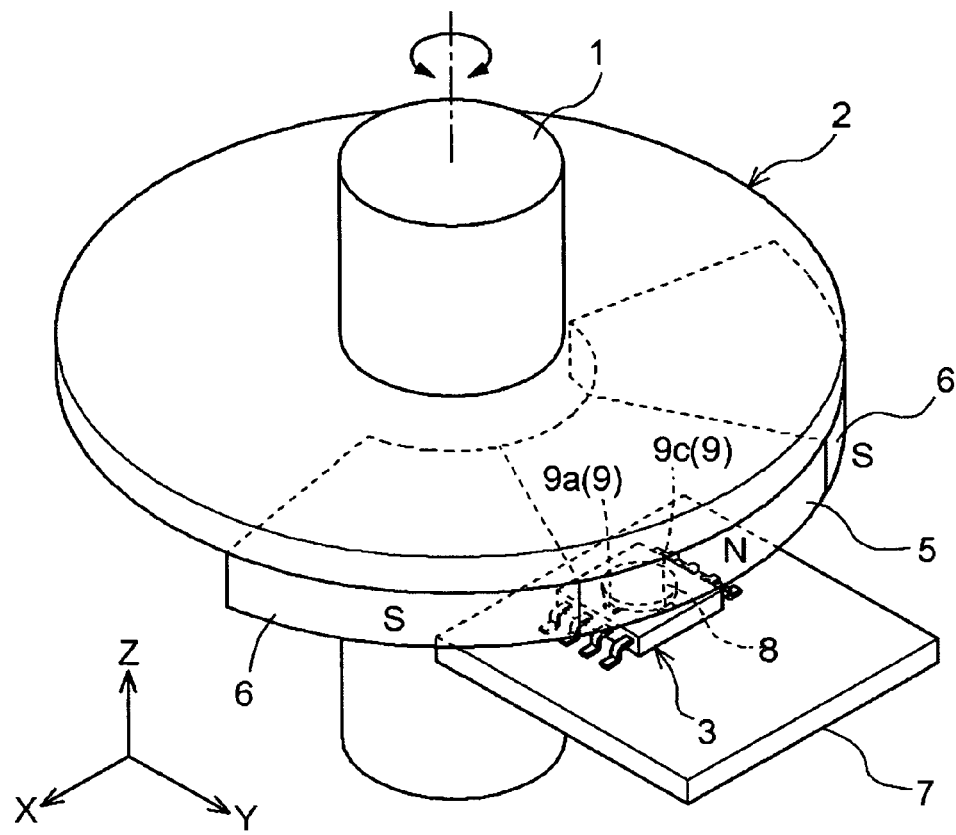
FIG. 18A is a perspective view of the angle detection apparatus according to a third embodiment and FIG. 18B is a sectional view of the angle detection apparatus according to the third embodiment.
Figure 18B:
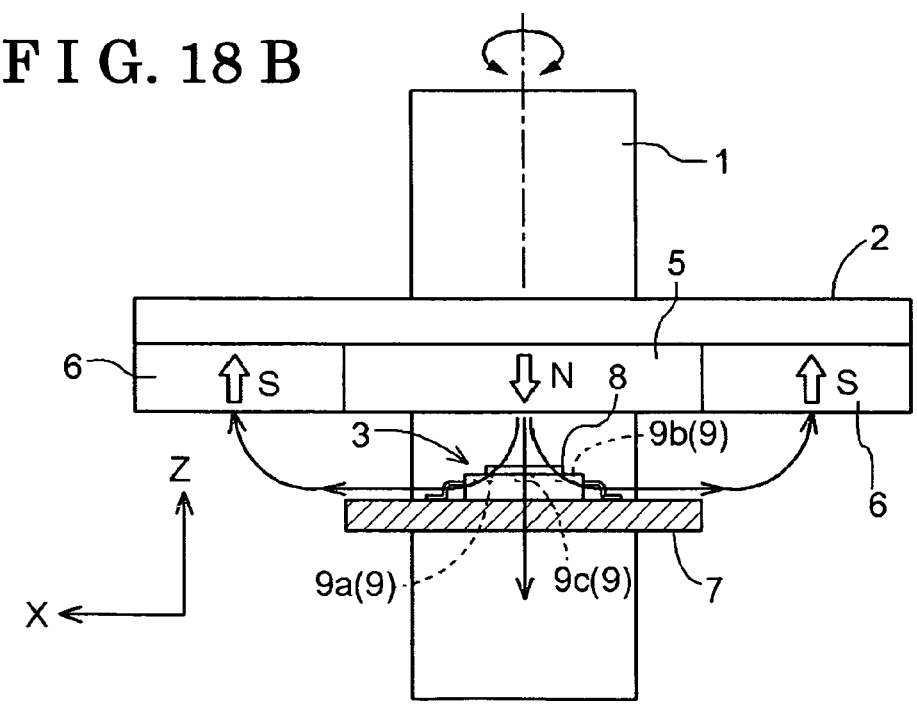
Figure 19A:
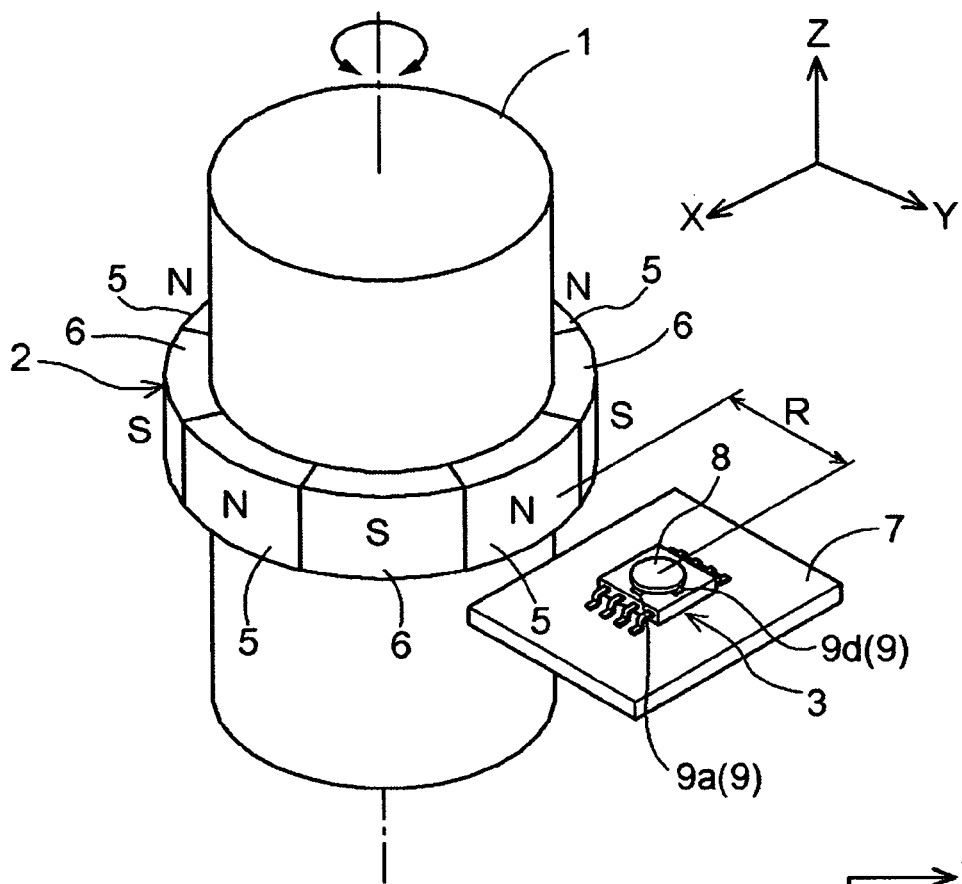
FIG. 19A is a perspective view of a known angle detection apparatus and FIG. 19B is a sectional view of the known angle detection apparatus.
Figure 19B:
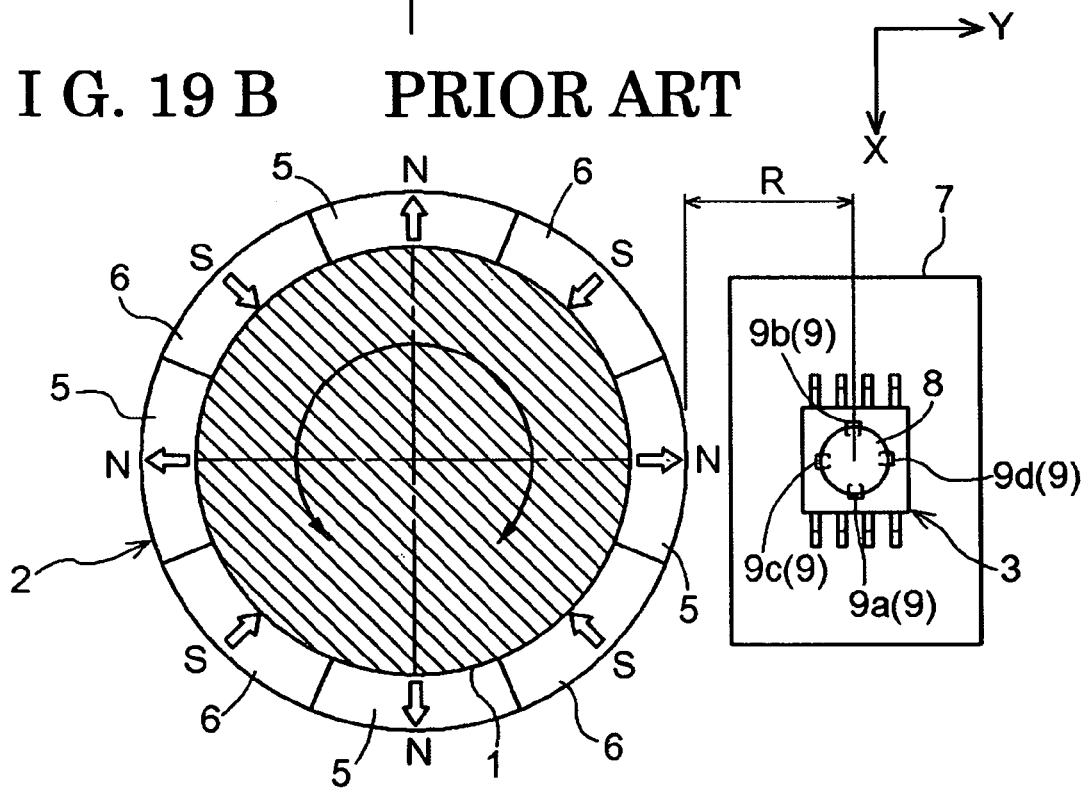

As shown in FIGS. 18A and 18B, the north magnetic polar region 5 and the south magnetic polar regions 6 are arranged so that the first direction (z direction), where the magnetic field intensity is at its maximum in the magnetic field generated around the rotation member 2, is arranged in parallel to the rotation center of the rotation member 2. The north magnetic polar region 5 and the south magnetic polar regions 6 are provided at a lower surface of the rotation member 2. The north magnetic polar region 5 and the south magnetic polar regions 6 are alternately arranged around the rotation center of the rotational member 2 in a manner that one north magnetic polar region 5 is sandwiched between the two south magnetic polar regions 6.

The magnetic field detecting portion 3 is disposed in a direction parallel to each north magnetic polar region 5 and each south magnetic polar region 6. The magnetic field detecting portion 3 is disposed so that the rotation member 2 vertically overlaps the magnetic field detecting portion 3 in the radial direction of the rotation member 2. The rotation member 2 rotates above the substrate 7 on which the magnetic field detecting portion 3 is provided as described above.

In the third embodiment, the first direction (Z-direction), where the magnetic field intensity is at its maximum in the magnetic field generated around the rotation member 2, corresponds to the direction of the axial center of the rotation member 2. The second direction (X-direction), which is set along the direction that the north magnetic polar region 5 and the south magnetic polar regions 6 are circumferentially arranged, corresponds to the rotation direction of the rotation member 2. The third direction (Y-direction) corresponds to the radial direction of the rotation member 2.

OTHER EMBODIMENTS

In the first, second, and third embodiments, the magnetic field detecting portion 3 may detect the magnitude of the magnetic component in the Z-direction by calculating an average value of the total output voltage, which is calculated by adding the output voltages of the detecting elements 9c and 9d arranged along the Y-direction, and the total output voltage, which is calculated by adding the output voltages of the detecting elements 9a and 9b arranged along the X-direction. Thus, the magnetic field detecting portion 3 may detect the magnitude of the magnetic component in the Z-direction by using both sets of the detecting elements, i.e. the set of the detecting elements 9a and 9b arranged along the X-direction and the set of the detecting elements 9c and 9d arranged along the Y-direction.

(2) In the first, second, and third embodiments, only one set of the detecting elements 9a and 9b, arranged along the X-direction, may be provided. In this case, the magnetic field detecting portion 3 detects the magnitude of the magnetic component in the Z-direction by adding each output voltage of the detecting elements 9a and 9b arranged along the X-direction. Further, the magnetic field detecting portion 3 detects the magnitude of the magnetic component in the X-direction by calculating the difference between the output voltages of the detecting elements 9a and 9b arranged along the X-direction.

(3) In the third embodiment, the magnetic field detecting portion 3 may be disposed at a radial outer side of the rotation member 2.

Since the magnetic plate 8 is a plate form, the degree of the magnetization varies depending on a direction that the external magnetic field is applied. Normally, it is more difficult to induce the magnetization when the external magnetic field is perpendicularly applied to the magnetic plate 8, compared to when the external magnetic field is parallely applied thereto. Thus, it is more difficult for the magnetic plate 8 to be magnetically saturated when the external magnetic field is perpendicularly applied to the magnetic plate 8, compared to when the external magnetic field is parallely applied thereto. Thus, the magnetic field detecting portion is disposed so that the magnetic plate 8 is oriented perpendicular to the first direction in the configuration described above. The configuration increases the level of the magnetic field intensity at which the magnetic plate 8 is magnetically saturated. Therefore, the distance from the surfaces of the north and south magnetic polar regions 5 and 6 to the magnetic field detecting portion 3 may be shortened and it is not necessary to form the north and south magnetic polar regions 5 and 6 by the rare-earth magnet having the high magnetic attraction and the like. Hence, the cost and the size of the apparatus are reduced. Further, the level of the magnetic field intensity at which the magnetic plate 8 is magnetically saturated is increased and the upper limit value of the magnetic field intensity, which is desirable for operating the magnetic field detecting portion 3, may be set at a higher level. Thus, the operating magnetic field of the magnetic field detecting portion 3 is set to a larger magnetic field intensity to improve the accuracy of the detection and reduce the cost.

According to the configuration described above, the north magnetic polar regions 5 and the south magnetic polar regions 6 are disposed so that the first direction intersects the second direction at a right angle.

The posture and the orientation of the magnetic field detecting portion 3 are easily adjusted when disposing the magnetic field detecting portion 3 due to the above-mentioned arrangement of the north and south magnetic polar regions 5 and 6. Thus, the magnetic field detecting portion 3 is easily disposed.

According to the configuration described above, the pair of detecting elements 9a and 9b is disposed along the second direction.

The configuration of the detecting elements 9a and 9b allows the magnitude of the magnetic component of the second direction to be directly detected by the pair of the detecting elements 9a and 9b. Thus, the magnitude of the magnetic component of the second direction is detected with great accuracy.

According to the configuration described above, the set of detecting elements 9 is comprised of the pair of detecting elements 9a and 9b disposed along the second direction on the surface perpendicular to the first direction and the pair of detecting elements 9c and 9d disposed along the direction that intersects the second direction at a right angle on the surface perpendicular to the first direction.

For example, the pair of detecting elements detecting the magnitude of the magnetic field component of the second direction may be assigned to the pair of detecting elements 9a and 9b disposed along the second direction. Further, the pair of detecting elements detecting the magnitude of the magnetic field component of the first direction may be assigned to the pair of detecting elements 9c and 9d disposed along the direction that intersects the second direction at the right angle. Thus, each pair of detecting elements 9a, 9b, 9c, and 9d assigned as described above detects the corresponding magnetic component, thereby detecting the magnitudes of the magnetic components of the two directions. Therefore, the detection structure is simplified. Further, for example, the magnitude of the magnetic field component of the first or second direction may be detected by calculating the average value of the detected value, which is detected by the detecting elements 9a and 9b arranged along the second direction, and the detected value, which is detected by the detecting elements 9c and 9d arranged along the direction that intersects the second direction at the right angle. Thus, the magnitudes of the magnetic components in the two directions are respectively detected by using the two pairs of detecting elements 9a, 9b, 9c and 9d with great accuracy.

According to the configuration described above, the rotation member 2 is disposed so that the north magnetic polar regions 5 and the south magnetic polar regions 6 are oriented radially outward of the rotation member 2, and the magnetic field detecting portion 3 is disposed at the radially outward of the rotation member 2, where the magnetic field detecting portion 3 faces the north magnetic polar regions 5 and the south magnetic polar regions 6.

The configuration allows the magnetic field detecting portion 3 to be disposed so that the magnetic plate 8 is oriented parallel to the rotation center of the rotation member 2. Thus, the profile of the magnetic field detecting portion 3 is reduced in the radial direction of the rotation member 2, and the size of the apparatus is reduced in the radial direction of the rotation member 2. Furthermore, the distance between the surfaces of the north and south magnetic polar regions 5 and 6 and the magnetic field detecting portion 3 may be reduced and the magnetic field detecting portion 3 may be disposed closer to the rotation member 2 in the radial direction of the rotation member 2. Therefore, the size of the apparatus is effectively reduced in the radial direction of the rotation member 2.

According to the configuration described above, the north magnetic polar regions 5 and the south magnetic polar regions 6 are disposed so that the first direction is in parallel with the rotation center of the rotation member 2, and the magnetic field detecting portion 3 is disposed in a direction parallel to each north magnetic polar region 5 and each south magnetic polar region 6.

The configuration allows the magnetic field detecting portion 3 to be disposed so that the magnetic plate is oriented parallel to the radial direction of the rotation member 2. Thus, the profile of the magnetic field detecting portion 3 is reduced in the axial center direction of the rotation member 2. Furthermore, the distance between the surfaces of the north and south magnetic polar regions 5 and 6 and the magnetic field detecting portion 3 may be reduced and the magnetic field detecting portion 3 may be disposed closer to the rotation member 2 in the axial center direction of the rotation member 2. Therefore, the size of the apparatus is effectively reduced in the axial center direction of the rotation member 2.

According to the embodiment described above, the north and south magnetic polar regions 5 and 6 are formed by one of an annular polar anisotropic magnet and a ring shaped polar anisotropic magnet.

As shown in the simulation described above, the polar anisotropic magnet is used as the rotation member 2 to reduce the changes in the direction of the magnetic field caused when the distance between the rotation member 2 and the magnetic field detecting portion 3 are changed in the radial direction. Thus, the polar anisotropic magnet is used as the rotation member 2, thereby reducing variations in a detection result caused by an assembly error of the angle detecting apparatus. Further more, even when a radial distance between the rotation member 2 and the magnetic field detecting portion 3 changes due to runout of the rotation shaft 1 during operation of the angle detecting apparatus, the variations in the detection result are reduced.

According to the embodiment described above, the north and south magnetic polar regions 5 and 6 are formed by an annular isotropic magnet or a ring shaped isotropic magnet, which is magnetized in a manner that distribution of a flux density is sinusoidal over surfaces of the north and south magnetic polar regions facing the magnetic field detecting portion 3.

The effects, which are similar to the polar anisotropic magnet, are achieved when the isotropic magnet, which is magnetized in the manner that the distribution of the flux density is substantially sinusoidal over the surface thereof facing the magnetic field detecting portion 3, is used as the rotation member 2. Generally, isotropic magnets are less costly than polar anisotropic magnets. Thus, the production cost is reduced by using the isotropic magnet as the rotation member 2.

According to the embodiment described above, a radial width of the magnet forming the north and south magnetic polar regions 5 and 6 is set so as to be larger than the half of circumferential length of the north magnetic polar region 5 and the half of circumferential length of the south magnetic polar region 6.

When the polar anisotropic magnet or the isotropic magnet, magnetized in the manner that the distribution of the flux density is substantially sinusoidal over the surface thereof, is used, the distribution of the magnetic field lines forms circles each having a center thereof on a boundary portion between the north magnetic polar region 5 and the south magnetic polar region 6 on an outer periphery surface of the rotation member 2, and each passing through a circumferential center of the north magnetic polar region 5 and a circumferential center of the south magnetic polar region 6, respectively. Thus, the radial width of the magnet that includes the north magnetic polar regions 5 and the south magnetic polar regions 6 is set to be larger than the half of circumferential width of each of the north magnetic polar region 5 and than the half of circumferential width of each of the south magnetic polar region 6. This setting allows the flux density to distribute in a desirable manner without discontinuing the magnetic field lines. As a result, the accuracy of the angle detection apparatus improves.

According to the embodiment described above, a groove 21 is formed at an outer peripheral surface of the magnet forming the north and south magnetic polar regions 5 and 6 and extends in the circumferential direction.

As shown in the simulation described above, forming the groove 21 at the outer peripheral surface of the magnet forming the north and south magnetic polar regions 5 and 6 reduces the changes of the direction of the magnetic field caused when the magnetic field detecting portion 3 is displaced relative to the rotation member 2. Thus, the groove 21 is formed at the magnet, thereby reducing the variations in the detection result caused by the assembly error of the angle detecting apparatus. Further more, even when the relative position between the rotation member 2 and the magnetic field detecting portion 3 changes due to runout of the rotation shaft 1 during the operation of the angle detecting apparatus, the variations in the detection result are reduced.

According to the embodiment described above, the magnetic field detecting portion 3 faces the portion of the magnet where the groove 21 is formed with respect to the direction of the rotation axis of the rotation member 2.

The effect that reduces the change in the direction of the magnet field caused when the magnetic field detecting portion 3 is displaced relative to the rotation member 2 becomes prominent in the region that the groove 21 is formed. Thus, the magnetic field detecting portion 3 is disposed to face the magnet in the region that the groove 21 is formed, thereby reducing the variations of the detection result.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An angle detection apparatus comprising:
a rotation member including at least one north magnetic polar region and at least one south magnetic polar region alternately arranged around a rotation center thereof;
a magnetic field detecting portion having a magnetic plate and a plurality of detecting elements detecting magnitudes of magnetic components in a direction perpendicular to the magnetic plate and storing the magnitudes of the magnetic components as information;
a computing means determining a rotation angle of the rotation member based on the information detected by the magnetic field detection portion; wherein
the magnetic field detecting portion is disposed so that the magnetic plate is oriented perpendicular to a first direction, where magnetic field intensity is at its maximum in a magnetic field generated around the rotation member, and the magnetic field detecting portion detects the magnitudes of the magnetic components in the first direction and a second direction which corresponds to a direction that the north magnetic polar regions and the south magnetic polar regions are circumferentially arranged.

2. An angle detection apparatus according to claim 1, wherein the north magnetic polar regions and the south magnetic polar regions are disposed so that the first direction intersects the second direction at a right angle.

3. An angle detection apparatus according to claim 1, wherein the plurality of detecting elements includes a first pair of detecting elements disposed along the second direction.

4. An angle detection apparatus according to claim 2, wherein the plurality of detecting elements includes a first pair of detecting elements disposed along the second direction.

5. An angle detection apparatus according to claim 1, wherein the plurality of detecting elements is comprised of the first pair of detecting elements disposed along the second direction on a surface perpendicular to the first direction and a second pair of detecting elements disposed along a direction that intersects the second direction at a right angle on the surface perpendicular to the first direction.

6. An angle detection apparatus according to claim 2, wherein the plurality of detecting elements is comprised of the first pair of detecting elements disposed along the second direction on a surface perpendicular to the first direction and a second pair of detecting elements disposed along a direction that intersects the second direction at a right angle on the surface perpendicular to the first direction.

7. An angle detection apparatus according to claim 3, wherein the plurality of detecting elements is comprised of the first pair of detecting elements disposed along the second direction on a surface perpendicular to the first direction and a second pair of detecting elements disposed along a direction that intersects the second direction at a right angle on the surface perpendicular to the first direction.

8. An angle detection apparatus according to claim 1, wherein the rotation member is disposed so that the north magnetic polar regions and the south magnetic polar regions are oriented radially outward of the rotation member, and the magnetic field detecting portion is disposed at the radially outward of the rotation member, where the magnetic field detecting portion faces the north magnetic polar regions and the south magnetic polar regions.

9. An angle detection apparatus according to claim 1, wherein the north magnetic polar regions and the south magnetic polar regions are disposed so that the first direction is in parallel with the rotation center of the rotation member, and the magnetic field detecting portion is disposed in a direction parallel to each north magnetic polar region and each south magnetic polar region.

10. An angle detection apparatus according to claim 1, wherein the north and south magnetic polar regions are formed by one of an annular polar anisotropic magnet and a ring shaped polar anisotropic magnet.

11. An angle detection apparatus according to claim 1, wherein the north and south magnetic polar regions are formed by an annular isotropic magnet or a ring shaped isotropic magnet, which is magnetized in a manner that distribution of a flux density is sinusoidal over surfaces of the north and south magnetic polar regions facing the magnetic field detecting portion.

12. An angle detection apparatus according to claim 10, wherein a radial width of the magnet forming the north and south magnetic polar regions is set so as to be larger than a half of circumferential length of the north magnetic polar region and a half of circumferential length of the south magnetic polar region.

13. An angle detection apparatus according to claims 11, wherein a radial width of the magnet forming the north and south magnetic polar regions is set so as to be larger than a half of circumferential length of the north magnetic polar region and a half of circumferential length of the south magnetic polar region.

14. An angle detection apparatus according to claim 1, wherein a groove is formed at an outer peripheral surface of the magnet forming the north and south magnetic polar regions and extends in a circumferential direction.

15. An angle detection apparatus according to claim 14, wherein the magnetic field detecting portion faces a portion of the magnet where the groove is formed with respect to a direction of a rotation axis of the rotation member.

* * * * *